(12) United States Patent
Ishikawa et al.

(10) Patent No.: US 9,581,815 B2
(45) Date of Patent: Feb. 28, 2017

(54) HEAD-MOUNTED DISPLAY

(71) Applicant: Sony Corporation, Tokyo (JP)

(72) Inventors: Hirotaka Ishikawa, Kanagawa (JP);
Takeshi Iwatsu, Kanagawa (JP);
Tsubasa Tsukahara, Tokyo (JP);
Masatoshi Ueno, Kanagawa (JP);
Tetsuro Goto, Tokyo (JP); Toshiyuki Nakagawa, Kanagawa (JP); Shinobu Kuriya, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 13/969,222

(22) Filed: Aug. 16, 2013

(65) Prior Publication Data

US 2014/0062841 A1     Mar. 6, 2014

(30) Foreign Application Priority Data

Aug. 31, 2012  (JP) .................. 2012-191247

(51) Int. Cl.
*G02B 27/01* (2006.01)
*G06F 3/0338* (2013.01)
*G06F 3/038* (2013.01)

(52) U.S. Cl.
CPC ....... *G02B 27/017* (2013.01); *G02B 27/0176* (2013.01); *G06F 3/038* (2013.01); *G06F 3/0338* (2013.01)

(58) Field of Classification Search
CPC .... G06F 3/016; G06F 3/03543; G06F 3/0338; G06F 3/0354; G06F 3/0362; G06F 3/03548; G06F 3/03545; G06F 3/03547; G06F 3/011; G06F 3/0395; G06F 3/038; G06F 3/0234; G06F 3/0346; G06F 3/0383; G06F 2203/013; G06F 2203/014; G06F 2203/015; G06F 2203/0333; G05G 9/047; G05G 9/04737; G05G 2009/0477; G05G 2009/04766; G05G 2009/04755; G05G 2009/04759; G05G 2009/0474; H01H 2003/008; H01H 13/85; H01H 13/86; H01H 2215/052; H01H 2223/003; H01H 2239/006
See application file for complete search history.

(56) References Cited

U.S. PATENT DOCUMENTS

| 5,228,348 | A | * | 7/1993 | Frigiere ............... 73/862.05 |
| 5,508,719 | A | * | 4/1996 | Gervais ............... 345/157 |
| 6,091,546 | A | * | 7/2000 | Spitzer ............... 359/618 |
| 6,990,867 | B2 | * | 1/2006 | Okada ............... G01L 5/165 73/780 |
| 2004/0203524 | A1 | * | 10/2004 | Wong et al. ............... 455/90.3 |

(Continued)

FOREIGN PATENT DOCUMENTS

JP     2002-258209     9/2002

*Primary Examiner* — Nalini Mummalaneni
(74) *Attorney, Agent, or Firm* — Chip Law Group

(57) ABSTRACT

A head-mounted display includes a main body, an operation unit, and a controller. The main body includes a display unit capable of displaying an image in front of an eye of a user. The operation unit includes a buffer that is connected to the main body and deformable with respect to the main body, and a first detector configured to output a detection signal depending on the deformation. The controller is configured to generate an image signal for generating an image based on the detection signal and to output the image signal to the display unit.

15 Claims, 20 Drawing Sheets

(56) References Cited

U.S. PATENT DOCUMENTS

| | | | |
|---|---|---|---|
| 2007/0052672 A1* | 3/2007 | Ritter et al. | 345/156 |
| 2007/0273643 A1* | 11/2007 | Erez et al. | 345/156 |
| 2011/0281533 A1* | 11/2011 | Deleus et al. | 455/90.2 |
| 2012/0133885 A1* | 5/2012 | Howell | G02C 5/143 |
| | | | 351/158 |

* cited by examiner

HEAD-MOUNTED DISPLAY

CROSS REFERENCES TO RELATED APPLICATIONS

The present application claims priority to Japanese Priority Patent Application JP 2012-191247 filed in the Japan Patent Office on Aug. 31, 2012, the entire content of which is hereby incorporated by reference.

BACKGROUND

The present disclosure relates to a head-mounted display.

A head-mounted display (HMD) is known. The HMD is mounted on a head of each user and capable of presenting an image to the user on a display or the like placed in front of the eyes. Control of a display image in the HMD is, in related art, performed by a dedicated input apparatus connected to the HMD. In this case, for example, it is necessary to bring the input apparatus when the HMD is carried or it is necessary to individually take out the input apparatus upon an input operation. Therefore, there is a problem of lack of convenience. In view of this, for example, a glasses-type HMD in which an operation unit is provided to a temple portion is known (see Japanese Patent Application Laid-open No. 2002-258209).

SUMMARY

However, when the user attaches the operation unit to an HMD main body mounted on the head, in some cases, an operation force is transmitted to the main body upon an input operation. With this, in some cases, blurring and the like are also caused in the display image of the HMD, which makes it difficult for the user to view the display image or causes the user to feel uncomfortable.

In view of the above-mentioned circumstances, it is desirable to provide an HMD having a configuration in which a main body of the HMD is provided with an operation unit and an influence of an input operation on the main body is reduced.

According to an embodiment of the present disclosure, there is provided a head-mounted display including a main body, an operation unit, and a controller.

The main body includes a display unit capable of displaying an image in front of an eye of a user.

The operation unit includes a buffer that is connected to the main body and deformable with respect to the main body, and a first detector configured to output a detection signal depending on the deformation.

The controller is configured to generate an image signal for generating an image based on the detection signal and to output the image signal to the display unit.

The head-mounted display (HMD) having the above-mentioned configuration includes the buffer deformable with respect to the main body. With this, the operation unit can be configured to reduce the influence of the input operation on the main body upon an input operation by the user. Therefore, it becomes possible to suppress transmission of an operation force to the main body upon an input operation and to prevent blurring and the like of an image to be displayed to the user.

The buffer may be formed along a first axis direction, and the operation unit may be connected to the buffer and may further include a tab portion that is less easily deformed than the buffer.

With this configuration, the user can grasp the tab portion with fingers and deform the buffer to perform an input operation. Therefore, the operation unit on which an input operation is easily performed can be provided.

Further, the buffer may be formed of a material more flexible than the main body.

With this, the buffer can be formed of a more deformable material than the main body. Therefore, a force necessary for an input operation can be reduced by the deformation of the buffer. Thus it is possible to thereby facilitate an input operation and to suppress an influence on the main body.

Further, the buffer may be formed to be thinner than the tab portion as viewed in the first axis direction.

With this, the buffer becomes more deformable and can suppress the influence of the input operation on the main body.

The buffer may be capable of being bent in a direction orthogonal to the first axis direction, and the first detector may further include a bending deformation sensor unit configured to output a detection signal based on a strain based on bending of the buffer.

With this, the buffer is bent in a direction orthogonal to the first axis direction, and the first detector can output the detection signal based on the bending. Therefore, a two-dimensional input operation becomes possible.

The bending deformation sensor unit may include two pairs of strain gauges provided to the buffer to be opposed to each of second and third axis directions orthogonal to the first axis direction and arranged along the first axis.

With this, the two pairs of strain gauges are capable of detecting strains based on bending of the second and third axis directions and also capable of outputting a detection signal relating to a two-dimensional input operation. Further, by adopting the strain gauges, it is possible to detect the strain based on the bending of the buffer with high accuracy.

The buffer may include a protrusion portion formed along the first axis direction.

With this, a cross-section shape has an anisotropy, and hence the user can feel the anisotropy also in "ease of bending" upon an input operation. Therefore, it becomes possible for the user to recognize a direction with a sense of a finger or the like that makes an operation, and to make a suitable operation even without directly viewing the operation unit.

Further, the tab portion may be capable of being compression-deformed, and the operation unit may further include a second detector that is provided to the tab portion and configured to output a detection signal based on compression-deformation of the tab portion.

With this, the detection signal based on an operation different from a two-dimensional moving operation can be outputted. For example, also the same decision operation as a left click operation of a mouse can be made using the operation unit.

The buffer may be capable of being torsion-deformed around the first axis, and the first detector may further include a torsion deformation sensor unit that is provided to the buffer and configured to output a detection signal based on torsion of the buffer.

With this, it is possible to output the detection signal based on an operation different from the two-dimensional moving operation, and to perform the same one-dimensional input operation as a jog dial, for example.

Further, the main body may further includes a temple portion including a first end portion that is connected to the display unit, and a second end portion that is engaged to an auricle of the user, and the operation unit may be connected to the temple portion.

With this, the operation unit is placed on a temporal region of the user upon mounting, and hence it is possible to prevent an input operation on the operation unit from obstructing viewing of images or the like.

The operation unit may be connected to protrude in the first axis direction, and the temple portion may extend in a second axis direction intersecting the first axis direction.

With this, an axis direction in which the temple portion extends and the first axis direction in which the operation unit protrudes do not correspond to each other. Thus, an input operation of the operation unit can be facilitated.

In addition, the operation unit may be connected between the first end portion and the second end portion of the temple portion.

With this, the operation unit can be provided at a position in the temple portion, at which the operation unit is less influenced by the hair and the auricles of the user. Further, the influence of the input operation on the main body can be reduced.

Alternatively, the operation unit may be connected to the second end portion of the temple portion.

With this, the operation unit is provided to the back side of the auricle, for example. Therefore, it is possible to provide a configuration in which the operation unit is unnoticeable upon mounting. At the same time, it is possible to reduce the influence of the input operation on the main body.

As described above, according to the embodiments of the present disclosure, it is possible to provide a configuration in which a main body of an HMD is provided with an operation unit, and to reduce an influence of an input operation on the main body.

These and other objects, features and advantages of the present disclosure will become more apparent in light of the following detailed description of best mode embodiments thereof, as illustrated in the accompanying drawings.

Additional features and advantages are described herein, and will be apparent from the following Detailed Description and the figures.

DETAILED DESCRIPTION

Hereinafter, embodiments of the present disclosure will be described with reference to the drawings.

First Embodiment

Figure 1:
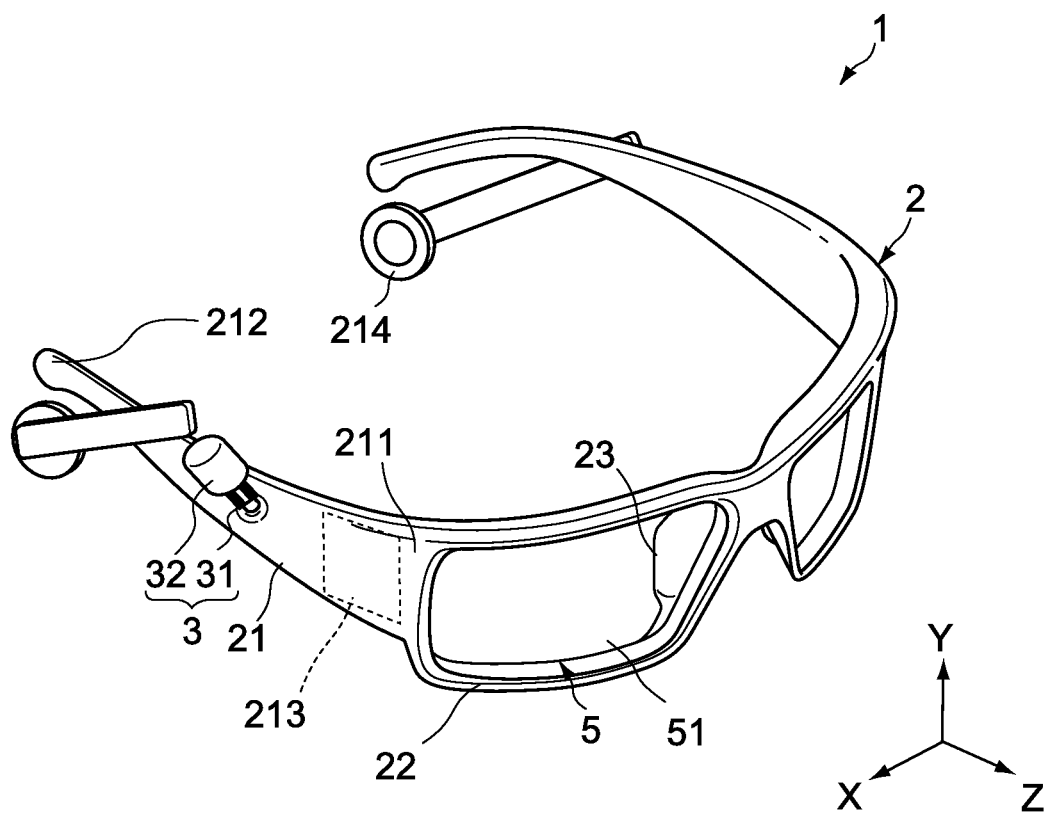
FIG. 1 is a perspective view showing a head-mounted display (HMD) according to a first embodiment of the present disclosure.
Figure 2:
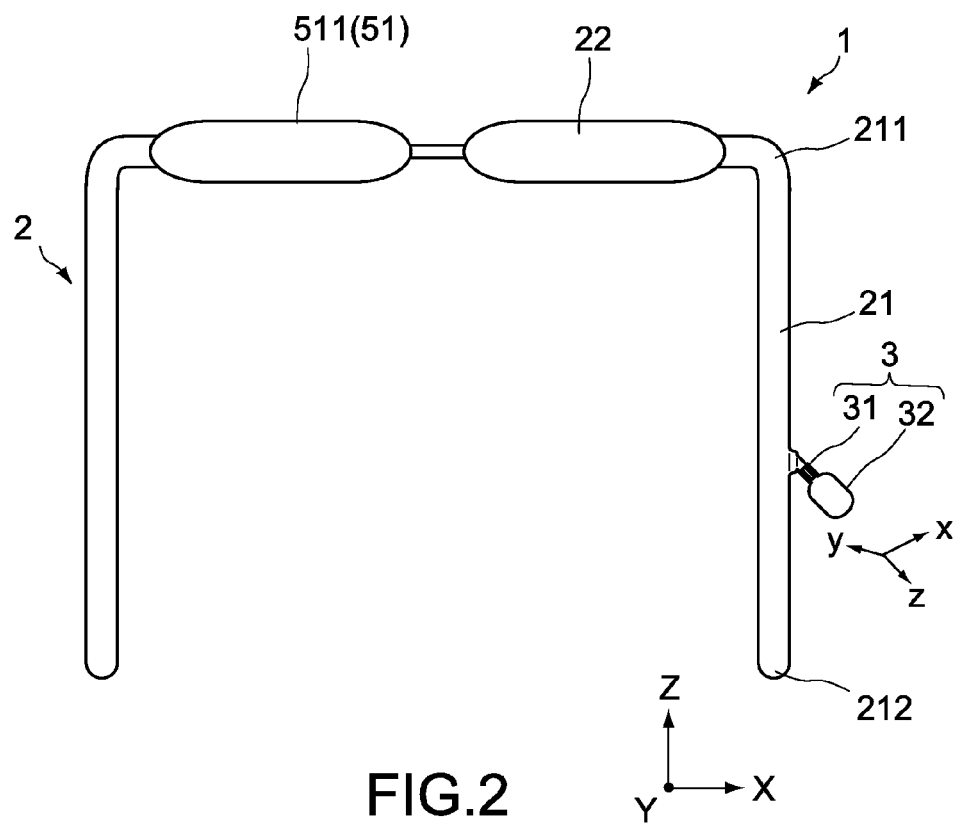
FIG. 2 is a schematic plan view of the HMD shown in FIG. 1.
Figure 3:
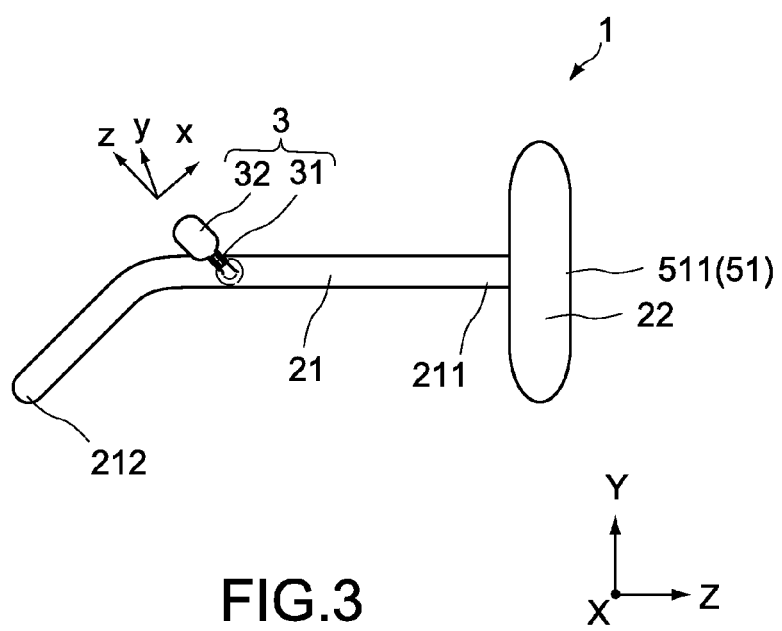
FIG. 3 is a schematic side view of the HMD shown in FIG. 1.
Figure 4:
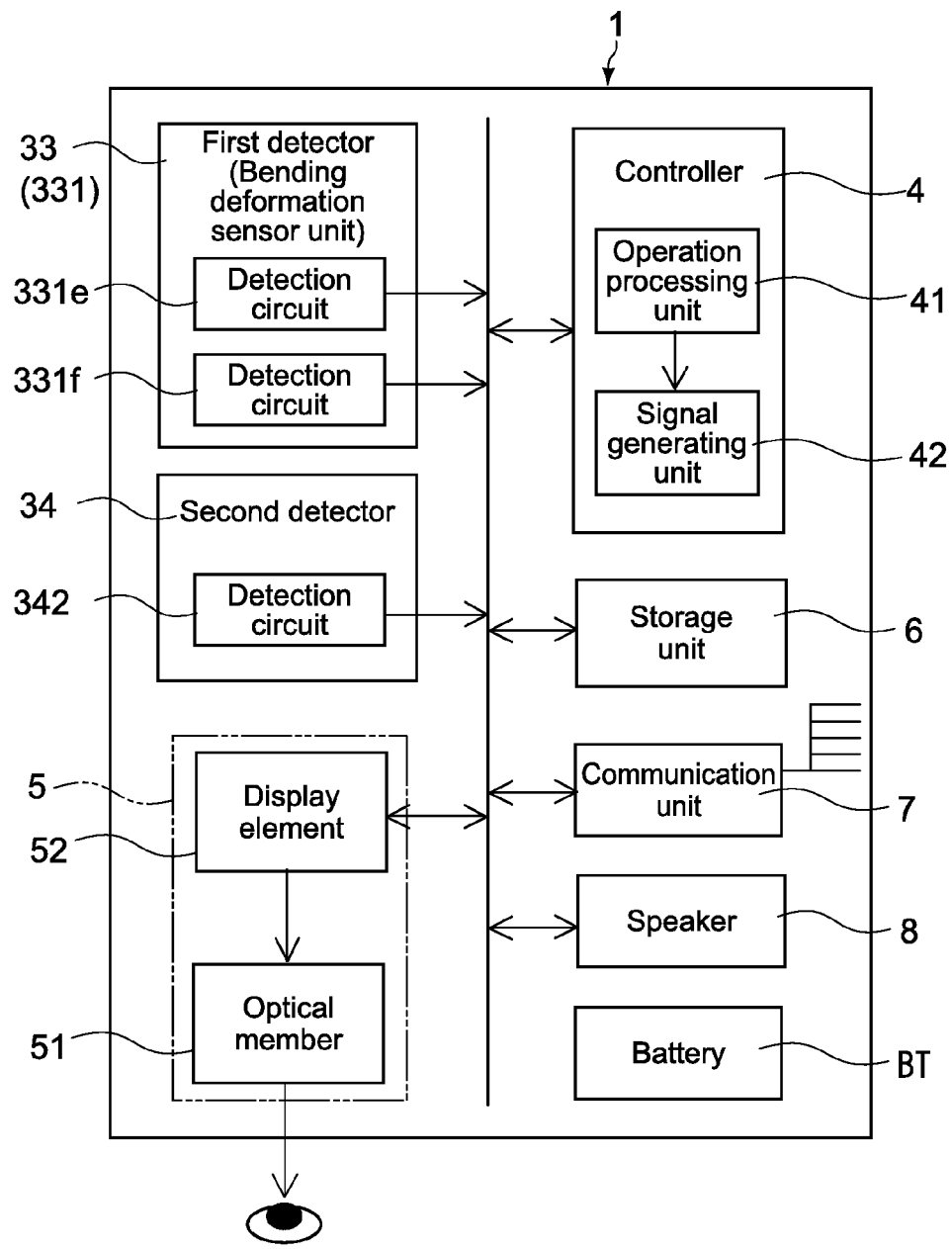
FIG. 4 is a block diagram showing an inner configuration of the HMD shown in FIG. 1.

FIGS. 1 to 4 are views each showing a head-mounted display (HMD) according to an embodiment of the present disclosure. FIG. 1 is a perspective view. FIG. 2 is a schematic plan view. FIG. 3 is a schematic side view. FIG. 4 is a block diagram showing an inner configuration. Note that an X-axis direction, a Y-axis direction, and a Z-axis direction in the figures indicate three axis directions orthogonal to one another. In this embodiment, the X-axis direction and the Y-axis direction indicate directions each parallel to a display surface in which an image is displayed to a user. Note that, in this embodiment, the Y-axis direction indicates a vertical direction (direction of gravitational force) upon mounting of the HMD 1. Further, an x-axis direction, a y-axis direction, and a z-axis direction (first axis direction) are three axis directions orthogonal to one another. In FIGS. 1 to 3, the z-axis direction indicates a direction that forms an angle of 45° with the Z-axis direction as viewed in the Y-axis direction, and a direction that forms an angle of 45° with the Z-axis direction as viewed in the X-axis direction.

[Entire Configuration of HMD]

An HMD 1 according to this embodiment includes a main body 2, an operation unit 3, a controller 4, a storage unit 6, a communication unit 7, a speaker 8, and a battery BT. The HMD 1 is, in this embodiment, configured as a see-through HMD. The main body 2 of the HMD 1 has a glasses-shape as a whole. The main body 2 of the HMD 1 is configured to be capable of presenting an image based on information inputted from the operation unit 3 to the user while the user putting the HMD 1 on the head is viewing an outside world.

Note that the main body 2 of the HMD 1 includes two display units 5 configured corresponding to each of the left and right eyes as will be described later. Those display units 5 have almost the same configuration. Therefore, in the drawings and the following explanation, common configurations of the two display units 5 will be denoted by the same reference symbols.

[Main Body]

The main body 2 includes the display units 5, a temple portion 21, and a rim portion 22. The rim portion 22 supports peripheries of optical members 51 of the display units 5 which will be described later. The rim portion 22 is provided to be almost orthogonal to the Z-axis direction, for example.

The temple portion 21 has a glasses' temple shape and is placed on temporal regions of the user. The temple portion 21 includes a first end portion 211 and a second end portion 212. The first end portion 211 is connected to the optical member 51 of the display unit 5 via the rim portion 22. The second end portion 212 is fixed to the auricle of the user. The temple portion 21 extends with the Z-axis direction being a longitudinal direction, for example, and is provided with the Y-axis direction being a width direction. Note that the "second axis direction" is an extending direction of the temple portion 21, which is the Z-axis direction in the HMD 1 shown in FIGS. 1 to 3.

The temple portion 21 and the rim portion 22 are formed of, for example, a synthetic resin such as a plastic resin and a hard rubber, or a relatively hard material such as a metal.

Note that the temple portion 21 and the rim portion 22 include two temple portions 21 and two rim portions 22 that are configured to respectively correspond to the left and right temporal regions and the left and right eyes of the user. The two temple portions 21 and the two rim portions 22 have almost the same configuration, and hence will be denoted by the same reference symbols in the drawings and the following description.

In this embodiment, the main body 2 includes a nose pad 23 attached between the two rim portions 22. With this, the main body 2 can be fixed to the nose bridge of the user to improve wearing comfort of the user. Note that, in FIGS. 2 and 3, earphones 214 and the nose pad 23 are omitted.

Further, the main body 2 may include the earphones 214 movably attached to the temple portion 21. With this, the user can enjoy audio as well as images.

In this embodiment, the main body 2 may include a housing portion 213. The housing portion 213 is made of an inner space formed to be capable of housing display elements 52 of the display units 5, the controller 4, the storage unit 6, the communication unit 7, the speaker 8, the battery BT, and the like. The housing portion 213 is provided in the first end portion 211 of the temple portion 21, for example.

[Display Unit]

Figure 5:
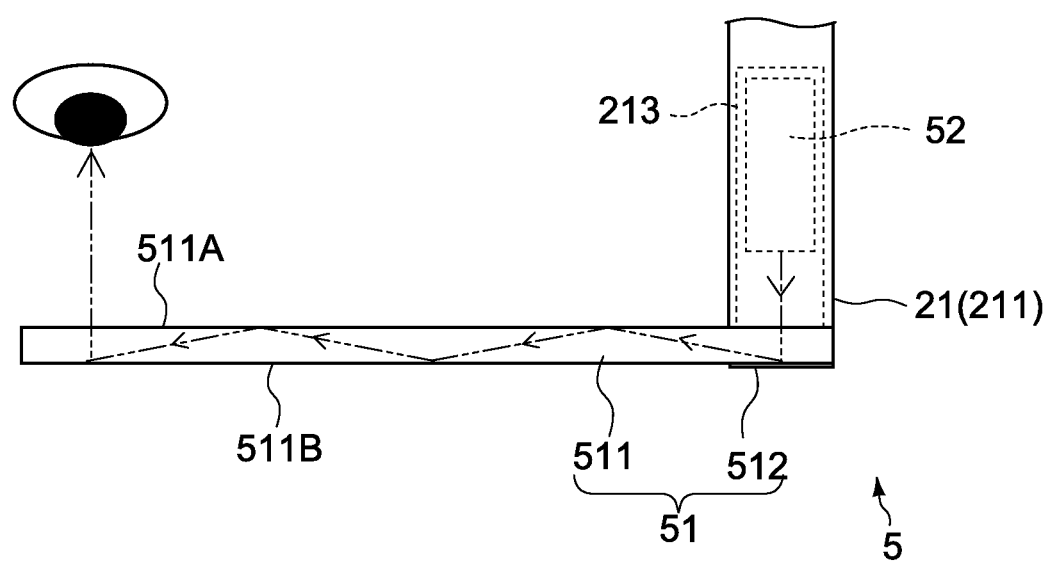
FIG. 5 is a schematic cross-sectional view showing a configuration of a display unit of the HMD shown in FIG. 1.

FIG. 5 is a view schematically showing a configuration of one of the display units 5. Specifically, FIG. 5 is a cross-sectional view as viewed in the Y-axis direction. The display unit 5 includes the optical member 51 and the display element 52. In the display unit 5, the display element 52 housed in the housing portion 213 of the main body 2 forms an image. Image light thereof is introduced into the optical member 51 and emitted to the eye of the user. In this way, the image is presented to the user.

In this embodiment, the display element 52 is constituted of, for example, a liquid-crystal display element (LCD). The display element 52 includes a plurality of pixels arranged in a matrix form. The display element 52 includes a light source (not shown) formed of a light-emitting diode (LED) or the like. The display element 52 modifies light inputted from the light source for each pixel according to the image signal generated by the controller 4. Then, the display element 52 outputs light for forming an image to be presented to the user. For the display element 52, it is possible to use a three-plate method in which image light corresponding to each color of R (red), G (green), and B (blue), for example, is individually emitted. Alternatively, it is also possible to use a single-plate method in which image light corresponding to each color is emitted at the same time.

The display element 52 is configured to output image light in the Z-axis direction, for example. Further, an optical system such as a lens may be provided depending on needs so as to emit image light, which is emitted from the display element 52, to the optical member 51 in a desired direction.

In this embodiment, the optical member 51 includes a light guide plate 511 and a polarizing element (hologram diffraction grating) 512. The optical member 51 is attached to be opposed to the display element 52 in the Z-axis direction.

The light guide plate 511 presents a screen to the user via a display surface 511A that outputs image light, the screen having a horizontal direction in the X-axis direction and a vertical direction in the Y-axis direction. The light guide plate 511 is formed, for example, in a light transmissive plate shape including the display surface 511A and an outer surface 511B. The display surface 511A has an XY-plane almost orthogonal to the Z-axis direction. The outer surface 511B is opposed to the display surface 511A. Upon mounting, the light guide plate 511 is arranged like a lens of glasses in front of the user, for example. The material of the light guide plate 511 may be appropriately adopted in view of reflectance and the like. For example, a light transmissive material such as a transparent plastic plate made of a polycarbonate resin, a polyethylene terephthalate (PET), or the like, a glass plate, and a ceramic plate is adopted.

The hologram diffraction grating 512 has a film-like structure made of, for example, a photopolymer material. The hologram diffraction grating 512 is provided on the outer surface 511B to be opposed to the display element 52 in the Z-axis direction. In this embodiment, the hologram diffraction grating 512 is formed as a non-see-through type.

However, the hologram diffraction grating 512 may be formed as a see-through type.

The hologram diffraction grating 512 is capable of efficiently reflecting light having a particular wavelength band at an optimal diffraction angle. The hologram diffraction grating 512 is, for example, configured to diffract and reflect light having a particular wavelength band, which is emitted in the Z-axis direction, in a direction in which the light can be totally reflected in the light guide plate 511, and to cause the light to be emitted from the display surface 511A toward the eye of the user. Specifically, as a particular wavelength band, a wavelength band corresponding to each color of R (red), G (green), and B (blue) is selected. With this, image light corresponding to each color emitted from the display element 52 propagates through the light guide plate 511 and is emitted from the display surface 511A. By image light of those colors being inputted into the eye of the user, it becomes possible to present a predetermined image to the user. Note that, in FIG. 5, only light having one kind of wavelength band is shown for the sake of convenience.

Further, a hologram diffraction grating separate from the hologram diffraction grating 512 may be provided at a position in the outer surface 511B, the position being opposed to the eye of the user. With this, it becomes easy to emit image light from the display surface 511A to a direction of the eye of the user. In this case, by using, for example, a see-through type hologram diffraction grating as the hologram diffraction grating, the configuration as the see-through type HMD can be maintained.

[Operation Unit]

Figure 6:
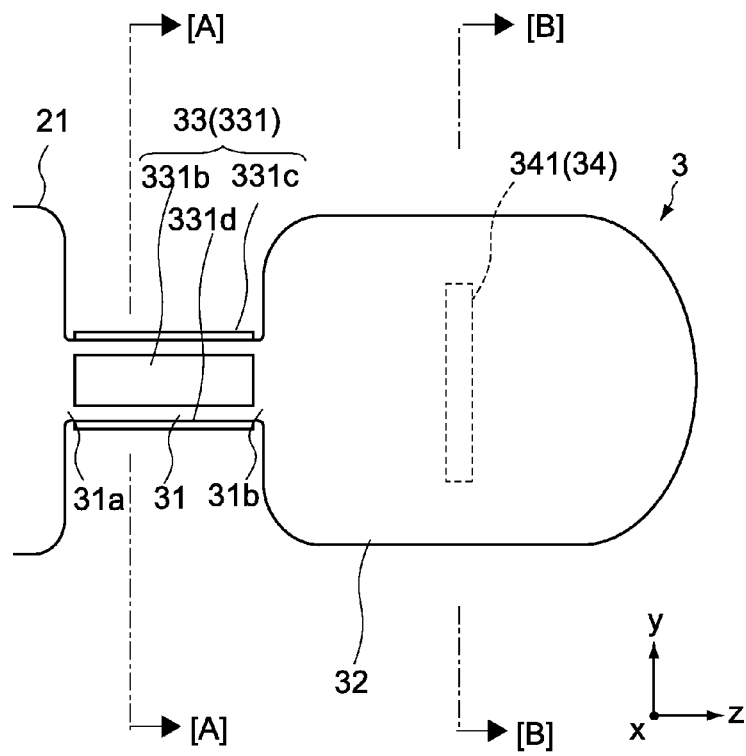
FIG. 6 is a schematic side view showing a configuration of an operation unit of the HMD shown in FIG. 1.
Figure 7:
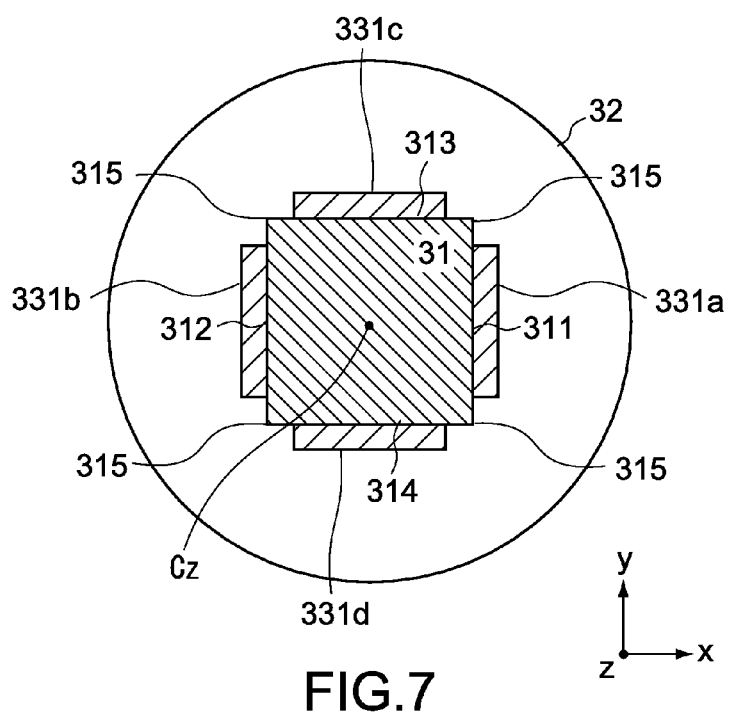
FIG. 7 is a schematic cross-sectional view as viewed in the [A]-[A] direction of FIG. 6.
Figure 8:
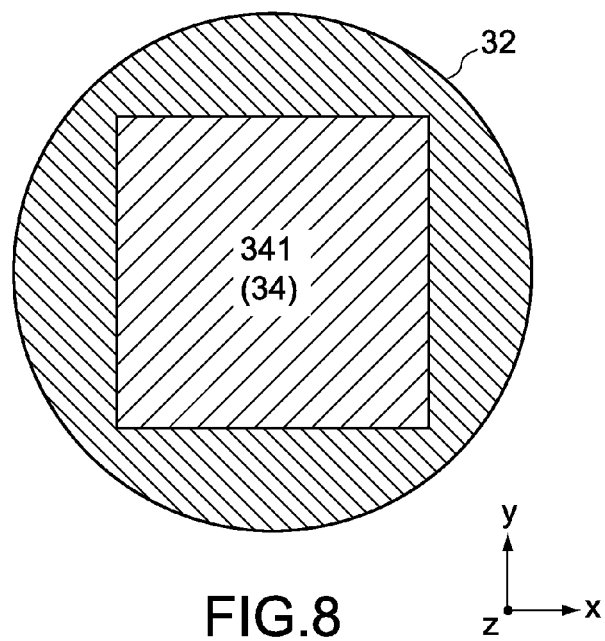
FIG. 8 is a schematic cross-sectional view as viewed in the [B]-[B] direction of FIG. 6.

FIGS. 6 to 8 are schematic views each showing a configuration of the operation unit 3 according to this embodiment. FIG. 6 is a side view. FIG. 7 is a cross-sectional view taken along the [A]-[A] direction of FIG. 6. FIG. 8 is a cross-sectional view taken along the [B]-[B] direction of FIG. 6.

The operation unit 3 includes a buffer 31, a tab portion 32, a first detector 33, and a second detector 34. In this embodiment, the operation unit 3 is provided between the first end portion 211 and the second end portion 212 of the temple portion 21 (see FIGS. 2 and 3). Specifically, the operation unit 3 is provided in vicinity of the temple of the user upon mounting. Further, the operation unit 3 is, as a whole, formed in a shaft shape protruding from the temple portion 21. The operation unit 3 is provided with the buffer 31 and the tab portion 32 that are arranged along the z-axis direction. The operation unit 3 is configured to be operable by the user holding the tab portion 32.

The buffer 31 is connected to the main body 2 and configured to be deformable with respect to the main body 2. The buffer 31 includes a connection end portion 31a and a connection end portion 31b. The connection end portion 31a is connected to the main body 2. The connection end portion 31b is connected to the tab portion 32. A bonding method between the main body 2 and the connection end portion 31a is not particularly limited. The bonding between the main body 2 and the connection end portion 31a may be performed in a mechanical manner such as screwing with a screw, or via an adhesive or the like.

Further, the operation unit 3 may further include a flange portion (not shown) formed integrally with the connection end portion 31a of the buffer 31, the flange portion being formed in a shape conforming to a surface of the temple portion 21. By the operation unit 3 being provided to the temple portion 21 via the flange portion, it is possible to more stably bond the operation unit 3 to the main body 2.

In this embodiment, the buffer 31 is formed in a prismatic shape extending along a z-axis. Specifically, the buffer 31 includes a first face 311, a second face 312, a third face 313, and a fourth face 314. The first face 311 and the second face 312 are formed to be opposed to each other in the x-axis direction and to be almost orthogonal to the x-axis direction. The third face 313 and the fourth face 314 are formed to be opposed to each other in the y-axis direction and to be almost orthogonal to the y-axis direction. In the first to fourth faces 311 to 314 of the buffer 31, strain gauges 331a, 331b, 331c, and 331d of the first detector 33 (bending deformation sensor unit 331) which will be described later are respectively provided.

Further, in this embodiment, the buffer 31 is formed to have an almost square cross-section as viewed in the Z-axis direction. Note that, Cz in the figure indicates a center Cz being an intersection of diagonals in a cross-section of the buffer 31 in the z-axis direction.

In this embodiment, the buffer 31 includes protrusion portions 315 formed along the z-axis direction. In this embodiment, the protrusion portions 315 are formed at a boundary portion between the first and second faces 311 and 312, a boundary portion between the second and third faces 312 and 313, a boundary portion between the third and fourth faces 313 and 314, and a boundary portion between the fourth and first faces 314 and 311. In other words, the protrusion portions 315 include vertices of a rectangle in the cross-section as viewed in the z-axis direction and are configured to project as "corners" of a prism.

Further, the buffer 31 is formed to be thinner than the tab portion 32 as viewed in the z-axis direction. In other words, as shown in FIG. 7, as viewed in the z-axis direction, an area occupied by the tab portion 32 includes an entire area occupied by the buffer 31.

The tab portion 32 is connected to the second connection end portion 31b of the buffer 31, and has a shape that is less easily deformed than the buffer 31. In this embodiment, the tab portion 32 is integrally formed with the buffer 31 such that the tab portion 32 is thicker than the buffer 31 as described above. The shape of the tab portion 32 is not particularly limited as long as it is easy for the user to grasp the tab portion 32. For example, the tab portion 32 is formed in an almost short cylinder shape along the z-axis direction. A strain gauge 341 to be described later is embedded in the tab portion 32.

The first detector 33 includes a bending deformation sensor unit 331 that outputs a detection signal depending on deformation of the buffer 31. The bending deformation sensor unit 331 outputs a detection signal based on bending of the buffer 31.

Figure 9:
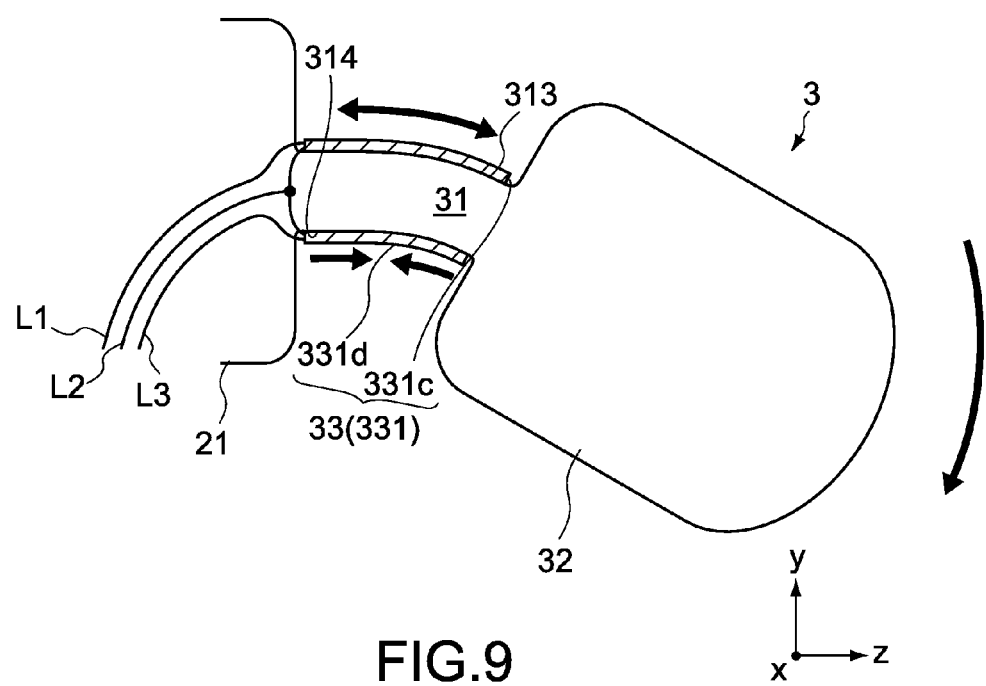
FIG. 9 is a schematic side view showing a state in which a buffer is bent in a direction orthogonal to a first axis direction in the HMD shown in FIG. 1.

FIG. 9 is a view showing a state in which the buffer 31 is bent in the y-axis direction. The buffer 31 is formed of a flexible material as will be described later. An operation of grasping the tab portion 32 and bending the buffer 31 in a direction orthogonal to the z-axis direction is possible. With this, the buffer 31 is bent in a direction parallel to an xy-plane. Based on a bending direction and the amount of bending of the buffer 31, a two-dimensional input operation in the xy-plane as with a touch sensor, a mouse, and the like can be made. Note that, upon an actual input operation, the user may perform not only the operation of grasping the tab portion 32 but also, for example, an operation of pushing down the tab portion 32 in the y-axis direction with an index finger.

The bending deformation sensor unit 331 includes the two pairs of strain gauges 331a, 331b, 331c, and 331d (see FIG. 7). The two pairs of strain gauges 331a, 331b, 331c, and 331d are opposed to each other in the x-axis direction and the y-axis direction and arranged on the buffer 31 along the z-axis direction. In other words, the strain gauges 331a and 331b are arranged to be opposed to each other in the x-axis direction. The strain gauges 331c and 331d are arranged to be opposed to each other in the y-axis direction. In this embodiment, the strain gauge 331a is bonded onto the first face 311. The strain gauge 331b is bonded onto the second face 312. The strain gauge 331c is bonded onto the third face 313. The strain gauge 331d is bonded onto the fourth face 314 with an adhesive or the like. Note that, in FIG. 9, the strain gauges 331a and 331b are omitted.

For example, when the buffer 31 is bent in the y-axis direction being the direction orthogonal to the z-axis direction as shown in FIG. 9, a tensile stress and a compression stress are caused in the first to fourth faces 311 to 314 of the buffer 31. With this, a strain is caused also in the strain gauges 331a to 331d. With this strain, resistance values of the strain gauges 331a to 331d change. Therefore, based on the amount of change of the resistance values, the bending direction and the amount of bending of the buffer 31 can be detected.

The bending deformation sensor unit 331 includes detection circuits 331e and 331f for outputting detection signals depending on the amount of change of the resistance values of the strain gauges 331a to 331d (see FIG. 4). The detection circuits 331e and 331f are bridge (Wheatstone bridge) circuits of a two-active gauge method each of which has an almost identical configuration. Specifically, in the detection circuit 331e, a circuit in which the strain gauge 331a and the strain gauge 331b are connected to each other in line and a circuit in which two fixed resistances are connected to each other in line are formed. Those circuits are connected to each other in parallel. Similarly, in the detection circuit 331f, a circuit in which the strain gauge 331c and the strain gauge 331d are connected to each other in line and a circuit in which two fixed resistances are connected to each other in line are formed. Those circuits are connected to each other in parallel. With this, the detection circuit 331e outputs a detection signal based on a strain based on bending deformation in the x-axis direction. The detection circuit 331f outputs a detection signal based on a strain based on bending deformation in the y-axis direction.

Note that, in FIG. 9, wirings L1 and L3 are wirings pulled out of the strain gauge 331c and the strain gauge 331d, respectively. A wiring L2 is a wiring connected to a middle point of a wiring connecting between the strain gauges 331a and 331b. Those wirings L1 to L3 are actually embedded in the operation unit 3 and the temple portion 21. However, in FIG. 9, for the sake of description, the wirings L1 to L3 are shown by the solid lines.

Figure 10:
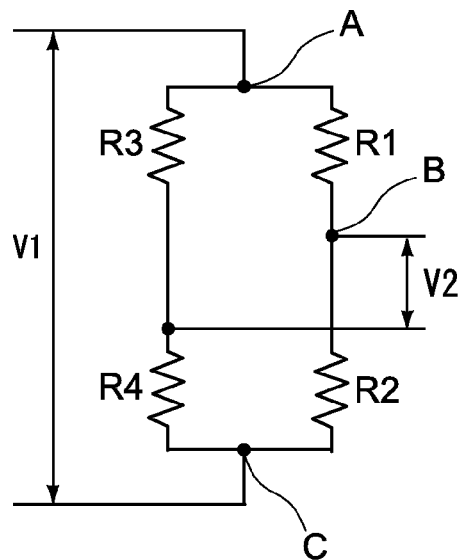
FIG. 10 is a view showing an equivalent circuit of a bridge circuit.

FIG. 10 is a view showing an equivalent circuit of the bridge circuit. In this equivalent circuit, for example, in the detection circuit 331f, the strain gauge 331c has a resistance value of R1, the strain gauge 331d has a resistance value of R2, and the fixed resistances respectively have resistance values of R3 and R4. Further, the A-, B-, and C-points of FIG. 10 correspond to the wiring L1, the wiring L2, and the wiring L3, respectively. At this time, an input voltage V1 is applied between the A-point and the C-point. A potential difference V2 between the B-point and the D-point is detected. In this case, a relationship between the input voltage V1 and an output voltage V2 is as follows.

$$V2=\{(R1*R3-R2*R4)*V1\}/\{(R1+R2)*(R3+R4)\} \quad (1)$$

By Expression (1), if a value of the potential difference V2 is detected, the input voltage V1 and the resistance values R3 and R4 of the fixed resistances are known, and hence a relationship of the amount of change based on the initial resistance values of R1 and R2 can be determined. Further, strains of the strain gauges 331c and 331d can be determined. Using the bridge circuits as the detection circuit 331f, the first detector 33 can detect the small amount of change of each resistance value of the strain gauges 331c and 331d, which can enhance the accuracy of strain detection. Note that the detection circuit 331e has the same configuration, and hence a description thereof is omitted.

Further, in general, it is known that the strain gauge changes in the amount of strain and, by association, the amount of change of the resistance value due to a temperature change. In the bridge circuit of the two-active gauge method, it is considered that all of the strain gauges connected to each other in line are used at the same temperature. Therefore, it is possible to overcome the amount of change of the resistance value due to the temperature change, using the ratio of the amount of change of the resistance values of those strain gauges. It is also possible to compensate for an influence of the temperature change.

The second detector 34 is provided in the tab portion 32 and outputs a detection signal based on compression-deformation of the tab portion 32. The second detector 34 includes the strain gauge 341 and a detection circuit 342.

Figure 11:
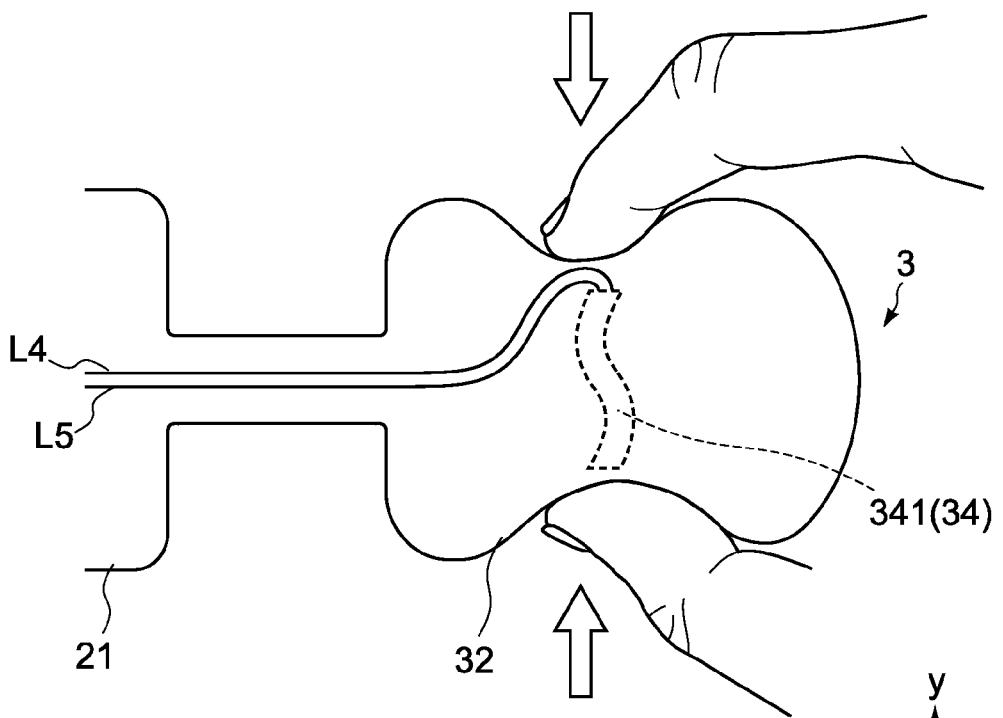
FIG. 11 is a schematic side view showing a state in which a tab portion is compression-deformed in the HMD shown in FIG. 1.

FIG. 11 is a view showing a state in which the tab portion is compression-deformed. As will be described later, the tab portion 32 is formed of a flexible material like the buffer 31. An operation of grasping and compression-deforming the tab portion 32 is possible. With this, for example, a decision operation for a graphical user interface (GUI) (indicated item) like a left click of a mouse becomes possible.

The strain gauge 341 is provided inside the tab portion 32 so as to be orthogonal to the z-axis direction along the y-axis direction, for example. With this, for example, by the user grasping the tab portion 32 in the y-axis direction and compression-deforming the tab portion 32, a strain is caused also in the strain gauge 341. Thus, the detection circuit 342 can detect compression-deformation of the tab portion 32.

The detection circuit 342 is a bridge circuit of a one-gauge method. The outline of the bridge circuit is the same as that of the equivalent circuit shown in FIG. 10, and hence a description thereof will be made referring to FIG. 10. For example, it is assumed that the strain gauge 341 has an electric resistance value of R1 and other fixed resistances respectively have resistance values of R2, R3, and R4. At this time, the wirings L4 and L5 pulled out of the strain gauge 341 correspond to the A-point and the B-point of FIG. 10, respectively. With this, a circuit in which the strain gauge 341 and a fixed resistance having a resistance value R2 are connected to each other in line and a circuit in which a fixed resistance having a resistance value R3 and a fixed resistance having a resistance value R4 are connected to each other in line. Those circuits are connected to each other in parallel. Therefore, by setting a potential difference e when a predetermined input voltage E is applied as a detection signal, R1 is determined by Expression (1). Based on the amount of change from the initial resistance value of R1, a magnitude of a strain of the tab portion 32 in the Y-axis direction can be calculated. Note that the wirings L4 and L5 are actually embedded in the operation unit 3 and the temple portion 21. However, in FIG. 11, for the sake of description, the wirings L4 and L5 are shown by the solid lines.

Figure 12:
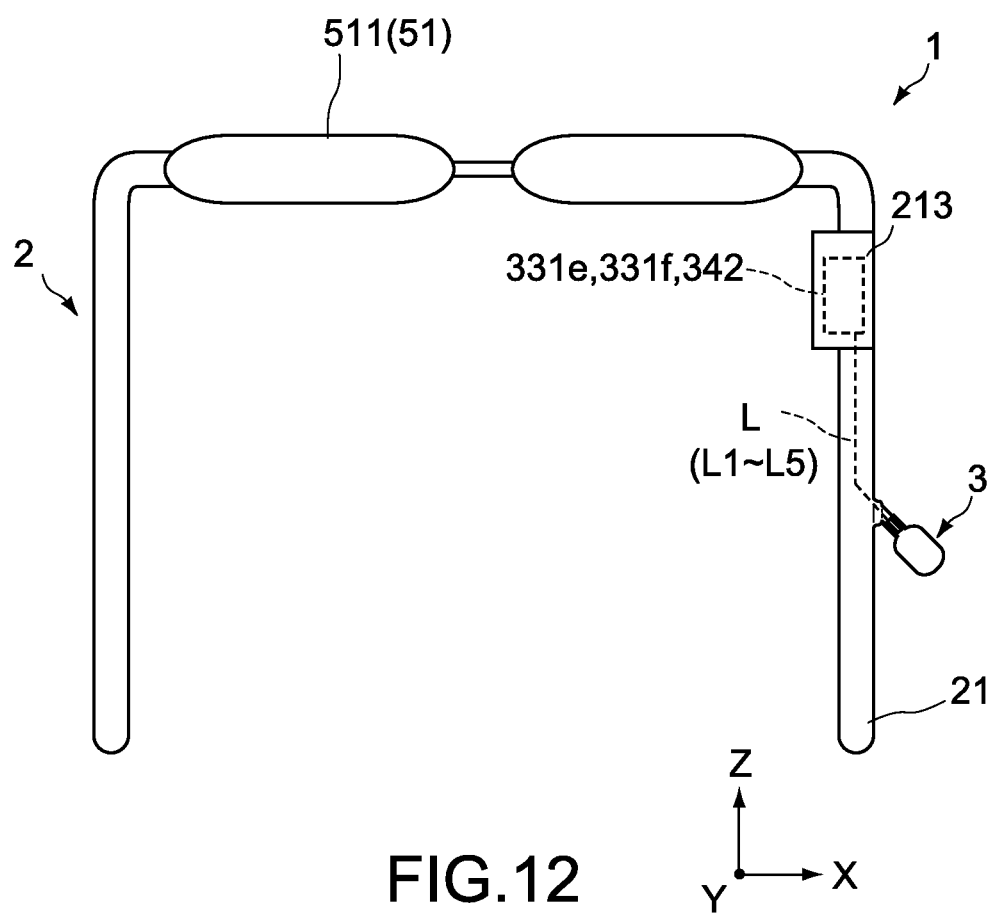
FIG. 12 is a view for explaining a position relationship between wirings pulled out from strain gauges of first and second detectors and detection circuits in the HMD shown in FIG. 1.

FIG. 12 is a schematic plan view for explaining a position relationship between the wirings L (wiring L1 to L5) pulled out of the strain gauges 331a to 331d, 341 and part of the detection circuits 331e and 331f, 342. For example, circuit elements excluding the strain gauges 331a to 331d, 341 of the detection circuits 331e and 331f, 342 are housed in the housing portion 213. In this case, the wirings L pass through the temple portion 21 and are connected to the detection circuits 331e and 331f, 342 of the housing portion 213. In addition, each of the detection circuits 331e and 331f, 342 are connected to the controller 4 within the housing portion 213. Detection signals of those detection circuits are outputted to the controller 4. With the first and second detectors 33 and 34 thus configured, the wirings pulled out of the strain gauges 331a to 331d, 341 can be made relatively short.

[Controller]

The controller 4 is typically configured by a central processing unit (CPU) or a micro-processing unit (MPU). The controller 4 generates an image signal for generating an image based on the detection signals from the first and second detectors 33 and 34. The controller 4 outputs the image signal to the display units 5. In this embodiment, the controller 4 includes an operation processing unit 41 and a signal generating unit 42. The controller 4 executes various functions according to programs stored in the storage unit 6. The operation processing unit 41 executes predetermined arithmetic processing on the detection signals outputted from the first and second detectors 33 and 34, to thereby generate operation signals including information on an input operation made by the user. Based on those operation signals, the signal generating unit 42 generates an image signal for displaying an image by the display element 52 of the display unit 5.

Based on an output of a bending detection sensor unit 331, the operation processing unit 41 calculates a coordinate position of a pointer or the like on an image to be displayed to the user. In other words, the operation processing unit 41 determines moving speed of a pointer in the X-axis direction on the display image based on an output of the detection circuit 331e. The operation processing unit 41 determines moving speed of the pointer in the Y-axis direction on the display image based on an output of the detection circuit 331f. In addition, XY-coordinate positions can be calculated by adding the moving speed in the X-axis direction and the Y-axis direction for each minute time. With this, according to an operation of bending the buffer 31 in a direction parallel to the xy-plane, the display image in which the pointer moves in the XY-plane is generated. Thus, a two-dimensional input operation becomes possible.

Further, according to an output of the second detector 34, the operation processing unit 41 determines compression-deformation of the tab portion 32. In other words, based on a detection signal outputted from the detection circuit 342, the operation processing unit 41 determines whether or not the strain gauge 341 is strained by a predetermined amount or more. If the operation processing unit 41 determines that the tab portion 32 is strained by the predetermined amount or more, the controller 4 executes particular processing assigned to a GUI or the like with which the pointer or the like overlaps, for example.

Those processing results by the operation processing unit 41 are transmitted to the signal generating unit 42.

Based on the processing results received from the operation processing unit 41, the signal generating unit 42 generates an image signal to be outputted to the display element 52. For example, based on the image signal based on the output of the bending detection sensor unit 331, an image in which, for example, the pointer displayed in an overlapping manner moves at predetermined speed in a menu selection image or the like in which the GUIs or the like are displayed is generated. Further, based on the output of the second detector 34, a new image depending on processing assigned to a determined GUI is generated.

The image signal generated by the signal generating unit 42 is outputted to each of the two display elements 52. Note that the signal generating unit 42 may generate image signals corresponding to the left and right eyes. With this, it becomes possible to present a three-dimensional image to the user.

Further, the controller 4 may include a circuit for outputting input voltages to the detection circuits 331e and 331f, 342. In addition, although not shown in the figures, the HMD 1 includes an A/D converter that converts detection signals (analog signals) outputted from the first and second detectors 33 and 34 into digital signals and a D/A converter that converts the digital signals into analog signals.

The storage unit 6 is constituted of a random access memory (RAM), a read only memory (ROM), other semiconductor memories, and the like. The storage unit 6 stores calculated xy coordinates of operation positions of fingers or the like of the user, programs used for various calculations by the controller 4, and the like. For example, the ROM is constituted of a non-volatile memory, and stores programs and setting values for causing the controller 4 to execute arithmetic processing such as calculation of moving speed of the pointer or the like. Further, for example, owing to the non-volatile semiconductor memory, the storage unit 6 can store programs or the like for executing assigned functions corresponding to them. In addition, those programs stored in the semiconductor memory or the like in advance may be loaded into the RAM and executed by the operation processing unit 41 of the controller 4.

The communication unit 7 is configured to be capable of communicating with a smart phone, a tablet terminal, and the like. A connection method for the communication unit 7 is not particularly limited. For example, a wireless communication such as "Wi Fi"®, "ZigBee"®, and "Bluetooth®" may be adopted. Alternatively, a wired communication via universal serial bus (USB), high-definition multimedia interface (HDMI), or the like may be adopted. Alternatively, the communication unit 7 may be configured to be directly connectable to the Internet using a high-speed data communication, a LAN cable, or the like.

The speaker 8 converts electrical audio signals generated by the controller 4 and the like into physical vibrations, and provides audio to the user through the earphones 214. A configuration of the speaker 8 is not particularly limited.

The battery BT constitutes a power source of the HMD 1 and supplies necessary electric power to the respective units of the HMD 1. The battery BT may be a primary battery or a secondary battery. Alternatively, the battery BT may be constituted of a solar cell. In addition, the HMD 1 may also include a switch (not shown) that controls activation or the like by pressing.

[Operation Example of HMD]

Next, a basic operation example of the HMD 1 will be described.

Figure 13:
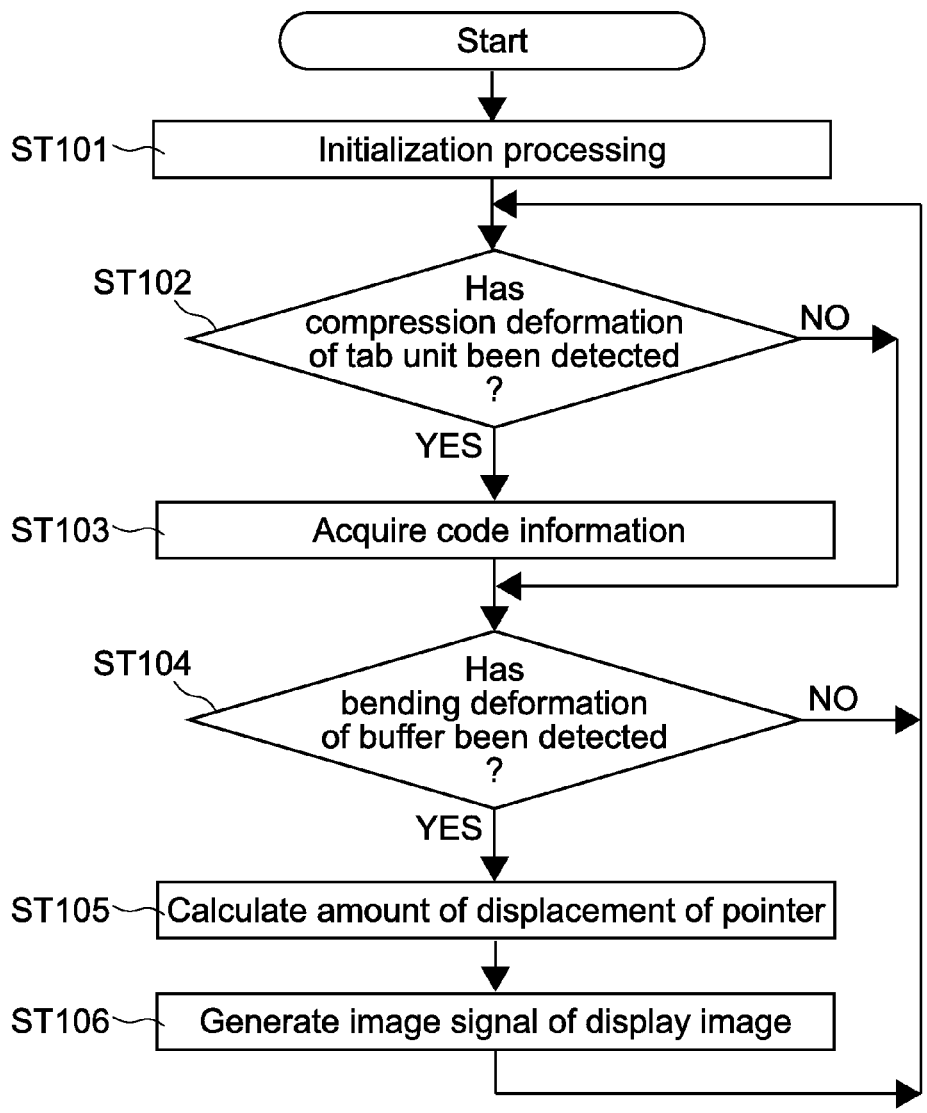
FIG. 13 is a flowchart in one operation example of the HMD shown in FIG. 1.

FIG. 13 is a flowchart in one operation example of the HMD 1 (controller 4). Here, an operation example of the HMD 1 when the user wears and activates the HMD 1 and makes an input operation of grasping the tab portion 32 and an input operation of bending the buffer 31 is shown.

To the user wearing the activated HMD 1, an image in which a number of GUIs are displayed, for example, is displayed via the display surface 511A. For example, the display image is a menu selection image of various settings of the HMD 1, and the respective GUIs correspond to switching to a silent mode, volume control, image reproduction, and fast-forward of the HMD 1 or a change and the like of a display mode of the pointer. The controller 4 is configured to be capable of changing the setting of the HMD 1 when an input operation with respect to the operation unit 3 by the user selects a particular GUI.

First, the controller 4 performs initialization processing (Step ST101). With this, an operation history of the pointer that is stored in the RAM or the like of the storage unit 6 is erased. Then, the signal generating unit 42 generates an image signal for displaying a pointer at a predetermined initial position in the display surface 511A. The display unit 5 presents an image in which the pointer is displayed at the initial position to the user. The initial position of the pointer may be a center of the display surface 511A, for example.

Next, based on a detection signal from the detection circuit 342 of the second detector 34, the operation processing unit 41 determines whether or not compression-deformation of the tab portion 32 has been detected (Step ST102). Specifically, the operation processing unit 41 calculates, based on the detection signal from the detection circuit 342, the amount of strain of a strain gauge 341, and determines whether or not the strain gauge 341 is strained by a predetermined amount or more due to the compression-deformation.

Then, if it is determined that the compression-deformation of the tab portion 32 has been detected (Yes in Step ST102), the controller 4 determines that a decision operation of the tab portion 32 has been made, and, for example, acquires code information corresponding to a display image upon the decision operation (Step ST103). For example, if an image in which the pointer is overlapped on a GUI for volume control is displayed upon the decision operation, the controller 4 may acquire the code information for displaying a volume control bar or the like. Alternatively, upon the decision operation, if the pointer is displayed at a position other than the positions of the GUIs, the controller 4 may acquire code information for displaying a predetermined menu.

Further, irrespective of whether or not the decision operation has been made, the operation processing unit 41 determines whether or not bending deformation has been detected (Step ST104). The operation processing unit 41 determines the bending deformation in the x-axis direction based on the detection signal of the detection circuit 331e of the bending deformation sensor unit 331. The operation processing unit 41 determines the bending deformation in the y-axis direction based on the detection signal of the detection circuit 331f. For example, the operation processing unit 41 calculates the amount of strain of each of the strain gauges 331a and 331b based on the detection signal of the detection circuit 331e. Based on that value, the operation processing unit 41 determines whether or not the buffer 31 is deformed in the x-axis direction. Similarly, based on the detection signal of the detection circuit 331f, the operation processing unit 41 determines whether or not the buffer 31 is deformed in the y-axis direction.

If the bending deformation in at least one of the x-axis direction and the y-axis direction has been detected (Yes in Step ST104), the operation processing unit 41 calculates the amount of displacement of the pointer (Step ST105). Specifically, based on the amount of strain of the strain gauges 331a and 331b, the operation processing unit 41 calculates speed of the pointer in the X-axis direction. Similarly, based on the amount of strain of the strain gauges 331c and 331d, the operation processing unit 41 calculates speed of the pointer in the Y-axis direction. In addition, the operation processing unit 41 calculates such speed in the X-axis direction and the Y-axis direction for each minute time and adds them, to thereby calculate a position of the pointer in the XY-plane on the display image. In addition, this information is outputted to the signal generating unit 42.

Based on the inputted calculation result of the XY-coordinate positions of the pointer in the XY-plane, the signal generating unit 42 generates an image signal of the display image in which the pointer is displayed at the XY-coordinate positions (Step ST106). In addition, the generated image signal is outputted to the display element 52 of the display unit 5 and presented to the user via the display surface 511A.

Further, if any bending deformation in the x-axis direction and the y-axis direction have not been detected (No in Step ST104) or if the image signal of the display image is generated (Step ST106), the operation processing unit 41 determines whether or not the compression-deformation of the tab portion 32 has been detected, again (Step ST102).

With a bending deformation operation of the operation unit 3 according to this embodiment, a two-dimensional input operation as with a mouse or a touch sensor is made possible. In other words, if the user bends the buffer 31 of the operation unit 3 in the x-axis direction by a predetermined amount, the pointer moves at speed corresponding to the amount of bending in the X-axis direction. Further, if the user bends the buffer 31 in the y-axis direction by the predetermined amount, the pointer moves at speed corresponding to the amount of bending in the Y-axis direction. In this manner, the bending direction and the amount of bending of the operation unit 3 are associated with the movement of the pointer on the display image, and hence the user can perform desired operations.

In addition, with a compression-deformation operation of the tab portion 32, a decision operation like a left click operation of the mouse is made possible. With such an operation unit 3, for example, in comparison with an input operation using a button, it becomes possible to smoothly make a two-dimensional input operation. Thus, the operability can be enhanced.

Note that the above-mentioned example is merely an example, and, for example, after the initialization processing, the operation processing unit 41 may determine whether or not the bending deformation has been detected. Then, the operation processing unit 41 may determine whether or not the compression-deformation of the tab portion has been detected. If the compression-deformation has been detected, the operation processing unit 41 may acquire the code information corresponding to a GUI displayed with the pointer being overlapped on the GUI.

Regarding the thus configured HMD 1, the operation unit 3 is provided to the main body 2, and hence it is unnecessary to take out a separate input apparatus upon an input operation. With this, in the HMD 1, an input operation can be made even in an environment in which it is difficult to take out the input apparatus, which can enhance the convenience. In addition, in the HMD 1, it is unnecessary to carry the input apparatus separate from the main body 2, and hence the portability can be enhanced.

Here, the operation unit 3 includes the buffer 31, and hence an influence of an input operation on the main body 2 can be suppressed. Hereinafter, the material and the shape of such a buffer 31 will be described.

[Material and Shape of Buffer]

As mentioned above, the buffer 31 is configured to be capable of being bending-deformed with respect to the main body 2 by an input operation of the user. Here, with respect to the main body 2 to which the connection end portion 31a is to be connected, a bending moment M is added based on the bending deformation of the buffer 31 in the direction orthogonal to the z-axis direction. In other words, if a large bending moment M is added to the main body 2, a vibration or the like due to the bending of the main body 2 is caused and blurring is caused also in the display image in front of the eye of the user. Therefore, the buffer 31 is formed of a material and formed in a shape such that the bending moment M caused in a joint portion with the main body 2 by an input operation of the user is smaller. With this, it is possible to reduce a force necessary for an input operation, and suppress an influence on the main body 2.

First, a material of the buffer 31 such that the bending moment M becomes smaller will be discussed. Assuming that F is a force (load) added by the user and l is a length from a position of the tab portion 32 grasped by the user to the main body 2, the bending moment M is expressed as follows.

$$M = F*l \quad (2)$$

Further, at this time, a stress σ generating in the buffer 31 is one obtained by subtracting a second moment of area I from M and multiplying it by a distance y from an axis parallel to the z-axis direction that passes through the center Cz of the buffer 31. It is known that the following Expression is obtained.

$$\sigma = (M*y)/I \quad (3)$$

In addition, the stress σ is expressed by the following expression using a Young's modulus E and a strain ε.

$$\sigma = E*\epsilon \quad (4)$$

From Expressions (2), (3), and (4) above, the bending moment M is expressed by the following expression using the Young's modulus E.

$$M = (\epsilon*E*I)*(I/y) \quad (5)$$

As can be seen from Expression (5), if the shape of the buffer 31 is not considered, in other words, if the second moment of area I and the distance y from the axis parallel to the z-axis direction that passes through the center Cz of the buffer 31 are fixed, it is necessary to reduce the Young's modulus E for reducing M. With this, as the material of the buffer 31, a flexible material having a small Young's modulus E is adopted.

In view of this, for the buffer 31, a flexible synthetic resin material such as a silicone rubber having a smaller Young's modulus E than the main body 2 is adopted. With this, it is possible to reduce the bending moment M added to the main body 2 and to buffer the operation force F to be transmitted to the main body 2.

More specifically, as the material of the buffer 31, a rubber material of 20° or more and 40° or less is adopted in a hardness test of JIS K 6253 standard (international rubber hardness degrees). In general, the hardness of the rubber material can be measured by the hardness test of JIS K 6253 standard. It is known that, as the value of the Young's modulus E becomes larger, the value of the rubber hardness also becomes larger. For example, if the rubber hardness of JIS K 6253 standard is 20°, the Young's modulus E is about 4 MPa. If the rubber hardness is 70°, the Young's modulus E is about 40 MPa. In such a hardness test, the amount of deformation when a constant load is added to a material can be set to a hardness value and be easily measured using a dedicated durometer.

As a specific material of the buffer 31, the following materials may be used. There are used, for example, an acrylic-based material, a polycarbonate (PC)-based material, a polyethylene terephthalate (PET)-based material, a polyethersulfone (PES)-based material, a polyarylate (PAR)-based material, a polyetheretherketone (PEEK)-based material, a liquid-crystal polymer (LCP)-based material, a polytetrafluoroethylene (PTFE)-based material, a polystyrene-based material, a styrene-based material, a urethane-based material, a silicone-based material, a polytetrafluoroethylene (PTFE: generally called Teflon®-based material, a fluorine-based resin, a cyclo-olefin polymer (COP)-based material, and acrylonitrile butadiene styrene copolymer (ABS)-based material. In addition, there are used materials obtained by synthesis or the like of all the above materials, materials derived from all the above materials, and polymer alloys obtained by mixing a rubber and the like of all the above materials.

Further, in addition to the above-mentioned materials, the following synthetic resins in general may be used. Specifically, there are used a phenolic resin (PF), an epoxy resin (EP), a melamine resin (MF), a urea-formaldehyde resin (urea resin (UF), an unsaturated polyester resin (UP), an alkyd resin, a thermosetting polyimide (PI), a polyethylene (PE), high-density polyethylene (HDPE), a middle-density polyethylene (MDPE), a low-density polyethylene (LDPE), a polypropylene (PP), a polyvinyl chloride (PVC), a polyvinylidene chloride, polystyrene (PS), a polyvinyl acetate (PVAc), an AS resin, a polyamide (PA), a nylon, a polyacetal (POM), a modified polyphenylene ether (m-PPE, modified PPE, PPO), a polybutylene terephthalate (PBT), a polyethylene terephthalate and glass resin mixed material (polyethylene terephthalate based material-G), a cyclic polyolefin (COP), a polyphenylenesulfide (PPS), a polysulfone (PSF), a polyether sulfone (polyether sulfone-based material), polyarylate (PAR), a liquid-crystal polymer (LCP), a polyether ether ketone (PEEK), a thermoplastic polyimide (PI), and a polyamide-imide resin (PAI). In addition, there are used materials obtained by synthesis or the like of all the above materials, materials derived from all the above materials, and polymer alloys obtained by mixing a rubber and the like of all the above materials.

Meanwhile, the main body 2 is formed of a material such as a metal, a plastic resin, and a hardened resin that has lower flexibility, that is, a larger Young's modulus E than that of the buffer 31. For example, if the main body 2 is formed of a metal, the Young's modulus E is generally 100 Gpa or more. Therefore, that Young's modulus E is $10^5$ or more times larger than the Young's modulus E of the buffer 31 formed of the above-mentioned rubber material. Alternatively, if the main body 2 is formed of a rubber material such as a hardened rubber, the main body 2 is formed of a material having a hardness value of 70° or more and 100° or less, the hardness value being based on the hardness test of the JIS K 6253 standard. If the main body 2 is formed of a plastic resin or the like, the main body 2 is formed of a material having a Young's modulus E of 40 MPa or more.

Next, also referring to FIG. 7, the shape of the buffer 31 such that the bending moment M is smaller will be discussed. First, regarding Expression (5), assuming that a section modulus is expressed using Z=I/y, it is expressed as follows.

$$M = \epsilon*E*Z \quad (6)$$

Expression (6) shows that, in the case where a material is not considered, the buffer 31 can decrease in the bending moment M as a section modulus Z becomes smaller.

Here, the section modulus Z will be discussed. First, the second moment of area Ix with respect to the x-axis (neutral axis) is the sum of products of a small area element dA of the cross-section and the square of the distance y from the x-axis at the position of the small area element dA. A value obtained by dividing the second moment of area Ix by the distance y from the x-axis is the section modulus Zx with respect to the x-axis. Therefore, considering the x-axis passing through the center Cz of the buffer 31 as the neutral axis, if the distance y from that x-axis to the surface of the buffer 31 is smaller than the distance y from the x-axis to a surface of the tab portion 32 in any point on the x-axis, it is considered that the section modulus Zx of the buffer 31 is smaller than the section modulus Zx of the tab portion 32. Further, also regarding the y-axis passing through the center Cz of the buffer 31, as long as a distance x from that y-axis to the surface of the buffer 31 is smaller than the distance x from the y-axis to the surface of the tab portion 32 at any points on the y-axis, it is considered that a section modulus Zy of the buffer 31 is smaller than the section modulus Zy of the tab portion 32.

Therefore, as viewed in the z-axis direction, if the buffer 31 is included in an entire area occupied by the tab portion 32, the buffer 31 is smaller in the section modulus Z than the tab portion 32. In this manner, as viewed in the z-axis direction, by the buffer 31 being formed to be thinner than the tab portion 32, the buffer 31 can decrease in the bending moment M at a joint portion with the main body 2. Note that, at this time, the second moment of area I of the buffer 31 is smaller than the tab portion 32, and hence the buffer 31 is more easily deformed than the tab portion 32. In other words, the tab portion 32 is less easily deformed than the buffer 31.

Further, even if the cross-section shape of the section modulus Z is not changed, the value of the section modulus Z changes depending on the distance y from the x-axis passing through the center Cz to the surface. For example, assuming that one side of the cross-section of the buffer 31 in the z-axis direction is "a", when the distance from the center Cz to the first to fourth faces 311 to 314 is "y", $Z=a^3/6$ is established. Meanwhile, when the distance from the center Cz to the protrusion portions 315 is set to y, $Z=a^3/6\sqrt{2}$ is established. Therefore, than directions parallel to the x-axis direction and the y-axis direction orthogonal to the first to fourth faces 311 to 314, the bending moment M of the buffer 31 when being bent in a direction linking the protrusion portions 315 and the center Cz increases.

In this manner, the buffer 31 includes the protrusion portions 315 formed such that the distance from the center Cz is longer than the other area of the buffer 31 surface, and hence the buffer 31 has an anisotropy regarding the "ease of bending." With this, even if it is difficult for the user to view the operation unit 3, the user can recognize the directions parallel to the x-axis direction and the y-axis direction by feeling the "ease of bending" upon an input operation. Thus, the user can bend the buffer 31 in a desired direction. Therefore, due to the protrusion portions 315, the user can perform a smooth input operation.

In addition, the buffer 31 is connected to the temple portion 21 of the main body 2. Therefore, it is considered that an influence on the main body 2 changes also depending on a position and an angle at which the buffer 31 is connected. Hereinafter, when the buffer 3 is connected to the temple portion 21, the position of the buffer 31 on the temple portion 21 capable of suppressing an influence of an input operation on the main body 2, and the angle at which the buffer 31 is connected will be discussed.

[Position and Angle at which Buffer is Connected to Temple Portion]

Figure 14:
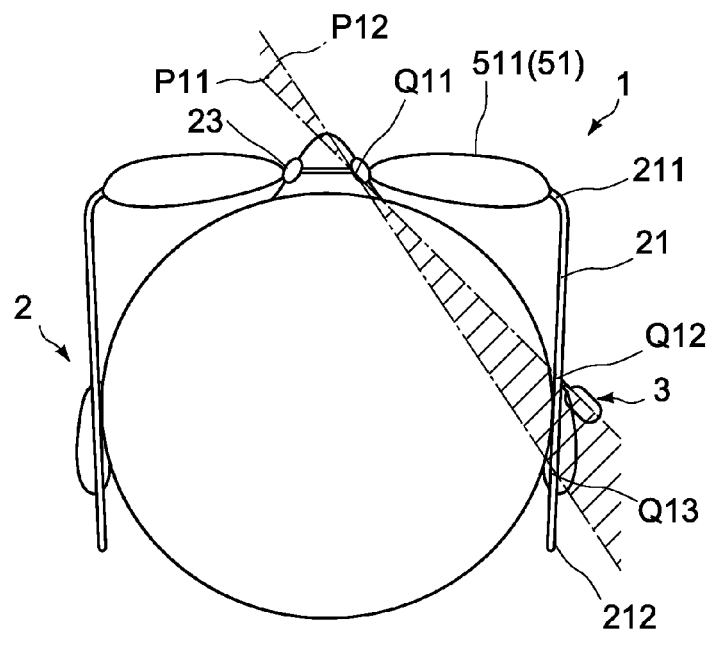
FIG. 14 is a schematic plan view that explains a position and an angle at which the operation unit is connected in an example of the first embodiment.
Figure 15:
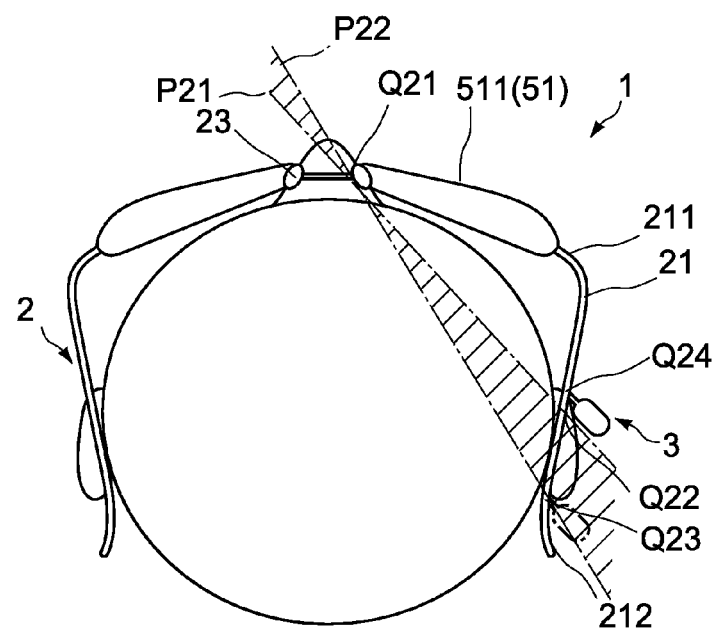
FIG. 15 is a schematic plan view that explains a position and an angle at which the operation unit is connected in another example of the first embodiment.

FIGS. 14 and 15 are views each explaining a position and an angle at which the buffer 31 is connected. Specifically, FIGS. 14 and 15 are plan views of the main body 2 worn by the user as viewed in the Y-axis direction. FIG. 14 is an example (Example 1) in which the temple portion 21 is provided in almost parallel to the Z-axis direction. FIG. 15 is an example (Example 2) in which the two temple portions 21 are arranged such that the distance between the second end portion 212 of the temple portions 21 is narrower than the distance between the first end portions 211 of the temple portions 21 and the temple portion 21 is arranged to form an acute angle with the Z-axis direction. The shape of the main body 2 according to Example 1 and Example 2 is a general glasses-shape. First, Example 1 will be described.

Example 1

The main body 2 according to Example 1 is mounted with the nose pad 23 being fixed to the nose bridge of the user and the temple portions 21 being fixed from the temples to the auricles of the user. Here, a point of the main body 2, at which the nose pad 23 is arranged, is referred to as a Q11-point. A point of the temple portion 21, which is closest to the first end portion 211 among points of the temple portion 21, which are fixed to the temple of the user, is referred to as a Q12-point. A point of the temple portion 21, which is closest to the second end portion 212 among points of the temple portion 21, which are fixed to the auricle of the user, is referred to as a Q13-point. In other words, each of the Q11-point, the Q12-point, and the Q13-point is a point being a fulcrum of the principle of leverage upon mounting.

First, a point at which the operation unit 3 is connected will be discussed. The operation unit 3 is subjected to an input operation by the user, and hence the point at which the operation unit 3 is connected is a point of effort. Therefore, as the point at which the operation unit 3 is connected, a point near the Q11-point, the Q12-point, and the Q13-point is selected. At this time, if the operation unit 3 is connected to the Q11-point, an input operation is performed in front of the light guide plate 511 (optical member 51) over the eye, and there is a possibility that it becomes difficult for the user to view the display image. Further, if the operation unit 3 is connected to the Q13-point, there is a possibility that it becomes difficult for the user to make an input operation due to the auricles and the hair of the user. Therefore, it is considered that an input operation with respect to the operation unit 3 becomes easy by the operation unit 3 being connected to the Q12-point.

Next, the angle at which the operation unit 3 is connected to the temple portion 21 will be discussed. The operation unit 3 is a shaft shape formed along the Z-axis direction, and hence, as an angle at which the operation unit 3 is connected, an angle formed between the z-axis direction in an XYZ-space and the z-axis in which the temple portion 21 extends only needs to be defined. In view of this, each of an XZ-plane (plane shown in FIG. 14) and a YZ-plane (plane shown in FIG. 3) will be discussed.

First, an angle formed between the z-axis direction and the Z-axis direction in the XZ-plane will be discussed. Here, it is assumed that a straight line linking between the Q11-point and the Q12-point is P11 and a straight line linking between the Q11-point and the Q13-point is P12. In Example 1, P11 forms an angle of about 45° with the Z-axis direction in the XZ-plane. In this case, by the weight of the display unit 5 and part of the temple portion 21, it is considered that a force of rotating the main body 2 in the direction of the gravitational force (Y-axis direction) with P11 being an axis acts on the main body 2. With this, it is desirable that an input operation of the operation unit 3 be performed to less contribute to that rotation force in view of maintaining a stable mounting state of the main body 2. Therefore, it is considered sufficient that an angle formed between the z-axis direction of the operation unit 3 and the Z-axis direction in the XZ-plane is 0° or more and about 45° or less, which is an angle formed between P11 and the Z-axis.

Further, in the XZ-plane, as an angle formed between the z-axis direction and the Z-axis direction becomes smaller, the operation unit 3 is provided at an angle closer to a head of the user. Thus, in view of the operability, it is considered desirable that an angle formed between the z-axis direction and the Z-axis direction in the XZ-plane be about 45°, which is a maximum value of the above-mentioned angle, at which the operation unit 3 is furthest from the head of the user. In other words, it is sufficient that the operation unit 3 according to Example 1 is provided at a position and an angle included in the shaded area between P11 and P12 in FIG. 14.

In addition, an angle between the z-axis direction of the operation unit 3 and the Z-axis direction in the YZ-plane will be discussed. First, in the case where the z-axis direction is parallel to the y-axis in the YZ-plane, that is, an angle formed with the Z-axis direction is 90°, the user operates the operation unit 3 from above in the vertical direction (Y-axis direction). In this case, it is necessary for the user to operate the operation unit 3 while raising an arm high, and hence the operation is difficult. On the other hand, in the case where the z-axis direction is parallel to the Z-axis direction in the YZ-plane, there is a possibility that the auricles obstruct operations. Therefore, if an angle formed between the z-axis direction and the Z-axis direction in the YZ-plane is about 45°, which is a middle of them, that is considered good also in view of the operability.

Example 2

Regarding Example 2, descriptions of the same points as those in Example 1 are appropriately omitted, and mainly different points will be described. Note that, in Example 2, the "second axis direction" is the extending direction of the temple portion 21, which is a direction different from the Z-axis direction.

First, a position at which the operation unit 3 is connected will be discussed. Regarding the main body 2, Example 2 is the same as Example 1 in that the nose pad 23 is fixed to the nose bridge of the user. However, Example 2 is different from Example 1 in that the temple portions 21 are fixed from the auricles to the back side of the auricles of the user. In other words, a Q21-point being a fulcrum of the main body 2 upon mounting is the same as the Q11-point of Example 1. However, a Q22-point and a Q23-point are different from Q12 and Q13. The Q22-point is a point fixed to the upper portion of the auricle. Q23 is a point fixed to the back side of the auricle. Both of those points are points of fulcrums of the principle of leverage upon mounting.

Here, in the case where the operation unit 3 is provided at the Q22-point being a fulcrum of the principle of leverage, the auricle obstructs the operations. With this, the operation unit 3 may be connected to a Q24-point that is near the first end portion 211 from the Q22-point and situated near the temples of the user as the point of Example 1. The Q24-point is slightly inferior to the Q22-point in view of stability, but the Q24-point can maintain sufficient stability if the Q24-point is near a distance from the Q22-point. At the same time, the Q24-point is higher operability as in the Q12-point of Example 1.

Meanwhile, the Q23-point is less influenced by the auricle in an input operation in comparison with the Q13-point. Therefore, the operation unit 3 may also be connected to the Q23-point being a fulcrum.

Therefore, the operation unit 3 is connected to either one of the Q24-point and the Q23-point. Note that, in FIG. 15, the operation unit 3 provided at the Q24-point is indicated by the solid line and the operation unit 3 provided at Q23 is indicated by an alternate long and short dash line.

Next, an angle at which the operation unit 3 is connected to the temple portion 21 will be discussed. Regarding an angle formed between the z-axis direction and the temple portion 21 in the XZ-plane, assuming that the straight line linking between the Q21-point and the Q22-point is P21 and the straight line linking between the Q21-point and the Q23-point is P22, as in Example 1, an angle formed between P21 and the temple portion 21 is considered desirable. Further, in Example 2, an angle formed between P21 and the temple portion 21 is about 45°. In addition, also at an angle formed between the z-axis direction of the operation unit 3 and the temple portion 21 in the YZ-plane, as in the first example, if an angle formed between the z-axis direction and the temple portion 21 in the YZ-plane is about 45°, which is considered good also in view of the operability.

As described above, it is sufficient that the operation unit 3 is connected to a position between the first and second end portions 211 and 212 of the temple portion 21 and, for example, near the temples of the user upon mounting. With this, it is possible to prevent an input operation from obstructing the display image, and to reduce the influence of an input operation on the main body 2. In addition, it is also possible to reduce an influence of an input operation due to the auricle and the hair. Alternatively, the operation unit 3 may be connected to the second end portion 212 of the temple portion 21. In this case, the operation unit 3 is placed at the back side of the auricle, for example. Thus, the operation unit 3 can be made unnoticeable upon mounting. Further, it is also possible to reduce an influence of an input operation on the main body 2.

In addition, it is sufficient that the operation unit 3 is provided such that the extending direction of the temple portion 21 intersects the z-axis direction. With this, it is possible to more easily perform an operation of the operation unit 3. Specifically, it is sufficient that an angle formed between the operation unit 3 and the temple portion 21 is about 45° in both of the XZ-plane and the YZ-plane. With this, the operability of the operation unit 3 can be enhanced.

Second Embodiment

Figure 16:
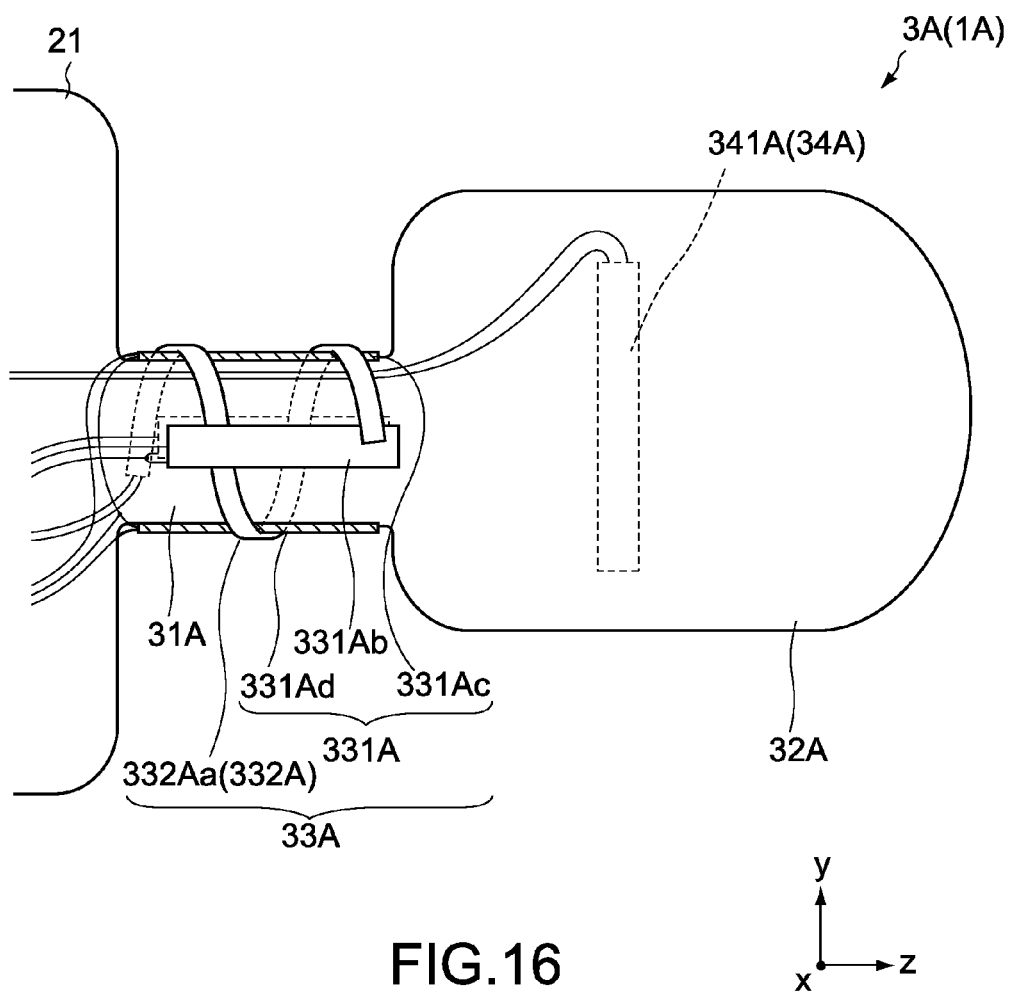
FIG. 16 is a schematic side view showing an HMD according to a second embodiment of the present disclosure.
Figure 17:
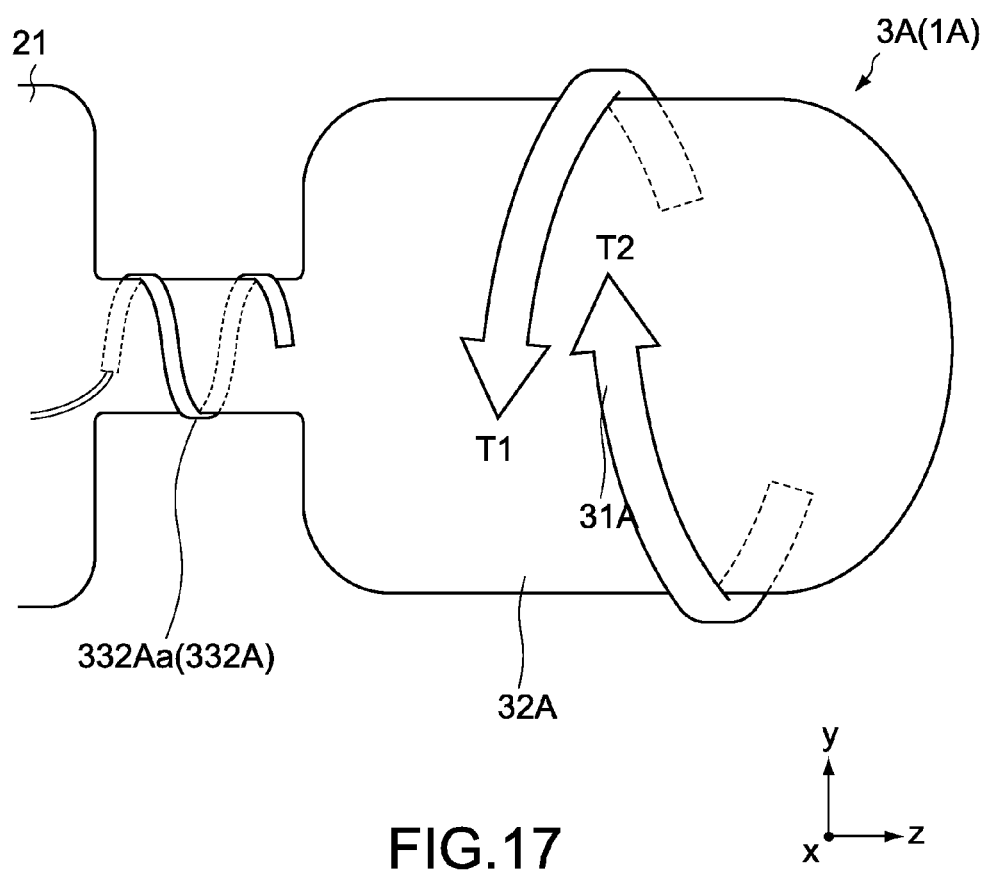
FIG. 17 is a schematic side view of an operation unit for explaining a state of an input operation of the HMD shown in FIG. 16.

FIGS. 16 and 17 are views each showing a configuration of the operation unit according to a second embodiment of the present disclosure. FIG. 16 is a schematic side view. FIG. 17 is a schematic side view for explaining an aspect of an input operation of the operation unit. Note that, in the figure, portions corresponding to those in the above-mentioned first embodiment are denoted by the reference symbols, and detailed descriptions thereof are omitted. Further, in FIG. 17, the tab portion is drawn with little emphasis.

An HMD 1A according to this embodiment is different from the HMD 1 according to the first embodiment in that a first detector 33A of an operation unit 3A is provided. In other words, the first detector 33A of the operation unit 3A according to this embodiment further includes a torsion deformation sensor unit 332A in addition to a bending detection sensor unit 331A.

In the operation unit 3A according to this embodiment, the user can perform an operation of grasping a tab portion 32A and giving the buffer 31A a twist around the z-axis. With this, depending on the torsion direction and the amount of torsion, a one-dimensional input operation on the display image becomes possible. For example, if a plurality of GUIs or the like are displayed along a one-axis direction as the display image, it becomes possible to change a GUI to be a selection candidate among the plurality of GUIs depending on the torsion direction and the amount of torsion. Alternatively, if a volume control bar is displayed as the display image, it also becomes possible to control a movement of the bar depending on the torsion direction and the amount of torsion to perform a volume control of audio to be outputted from the earphones 214 through the speaker 8. In other words, for example, a one-dimensional input operation similar to a jog dial becomes possible.

Further, unlike the first embodiment, the buffer 31A according to this embodiment is formed in a cylinder shape along the z-axis direction. With this, an operation of further giving a twist can be smoothly performed.

The torsion deformation sensor unit 332A is provided to the buffer 31A and outputs a detection signal based on a torsion of the buffer 31A. The torsion deformation sensor unit 332A includes a strain gauge 332Aa and a detection circuit (not shown). The strain gauge 332Aa is provided to be wound around a peripheral surface of the buffer 31A and fixed with an adhesive or the like. With this, for example, if a torsion is generated in a T1 direction in FIG. 17 that is a winding direction of the strain gauge 332Aa, the strain gauge 332Aa stretches. If a torsion is generated in the T2 direction in FIG. 17 that is an opposite direction to a winding direction of the strain gauge 332Aa, a strain is caused when the strain gauge 332Aa is contracted, and a torsion of the buffer 31A around the z-axis is detected.

A detection circuit of the torsion deformation sensor unit 332A is a bridge circuit of a one-gauge method as in the detection circuit 342 of the second detector 34A. In other words, the outline of the bridge circuit is identical to that of the equivalent circuit shown in FIG. 10. By setting a potential difference e when a predetermined input voltage E is applied as a detection signal, R1, i.e., the amount of change of a resistance value of the strain gauge 332Aa can be determined based on Expression (1). With this, the torsion direction and the amount of torsion depending on a strain of the strain gauge 332Aa can be calculated.

Further, based on an output of the torsion deformation sensor unit 332A, the operation processing unit 41 of the controller 4 calculates the torsion direction and the amount of torsion of the buffer 31. Then, based on the torsion direction and the amount of torsion, speed in the XY-plane to change a GUI as a selection candidate in the display image, for example, is calculated. In addition, values of such speed obtained by calculation within a minute time are added. In this manner, XY-coordinate positions of a GUI or the like to be a selection candidate can be determined.

The signal generating unit 42 generates an image signal depending on an output of an operation processing unit 43. For example, an image signal for identifying a GUI on the XY-coordinate positions calculated by the operation processing unit 43 from other GUIs and recognizing that GUI as a selection candidate is generated. Specifically, only the selection candidate GUI may be surrounded or a color of the selection candidate GUI may be changed from the other GUIs. In this case, the signal generating unit 42 may generate an image signal such that a GUI changed in color out of a number of GUIs displayed moves in a predetermined direction.

As described above, the HMD 1A according to this embodiment is capable of performing an operation of further giving the buffer 31A a twist in addition to the operation relating to the bending deformation of the buffer 31A and the operation of grasping the tab portion 32A that have been described in the first embodiment. Thus, according to this embodiment, the range of operation is widened depending on the display image and the like and the HMD 1A having higher operability can be provided.

Third Embodiment

Figure 18:
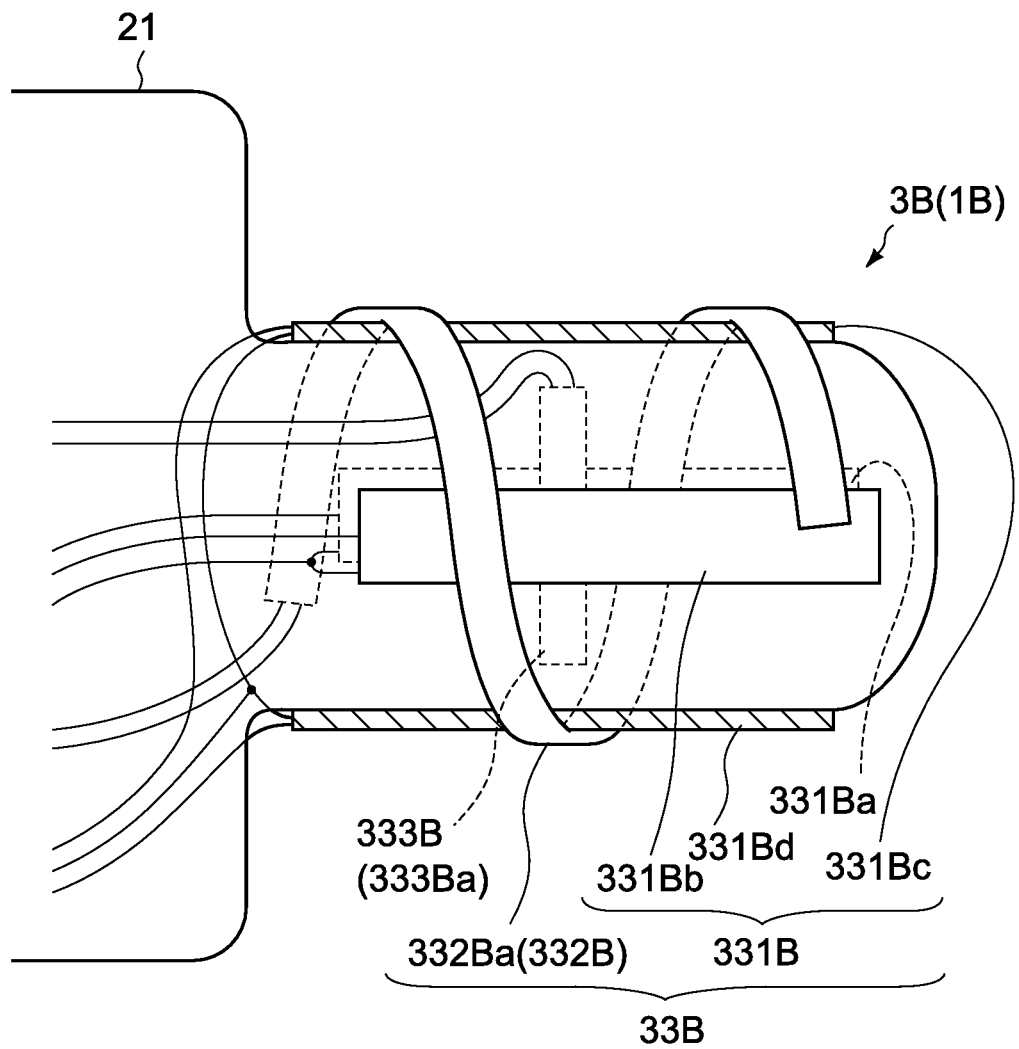
FIG. 18 is a schematic side view showing an HMD according to a third embodiment of the present disclosure.

FIG. 18 is a schematic side view showing a configuration of an operation unit according to a third embodiment of the present disclosure. Note that, in the figure, portions corresponding to those of the above-mentioned first and second embodiments will be denoted by the same reference symbols and detailed descriptions thereof will be omitted.

An operation unit 3B according to this embodiment is different from the operation unit 3A according to the second embodiment in that the operation unit 3B according to this embodiment includes a buffer 31B and a first detector 33B but does not include a tab portion and a second detector, and the operation unit 3B is formed in a cylinder shape along the z-axis direction as a whole.

Further, the first detector 33B includes a bending deformation sensor unit 331B, a torsion deformation sensor unit 332B, and a compression-deformation sensor unit 333B. The bending deformation sensor unit 331B and the torsion deformation sensor unit 332B have configurations similar to those of a bending deformation sensor unit 331A and the torsion deformation sensor unit 332A according to the second embodiment. The compression-deformation sensor unit 333B includes a strain gauge 333Ba having the same configuration as that of the second detector 34A of the second embodiment. The compression-deformation sensor unit 333B is capable of detecting a compression-deformation of the buffer 31B in the Y-axis direction.

According to this embodiment, an operation unit 33B does not include a tab portion, and hence the operation unit 33B can be reduced in size.

Fourth Embodiment

Figure 19:
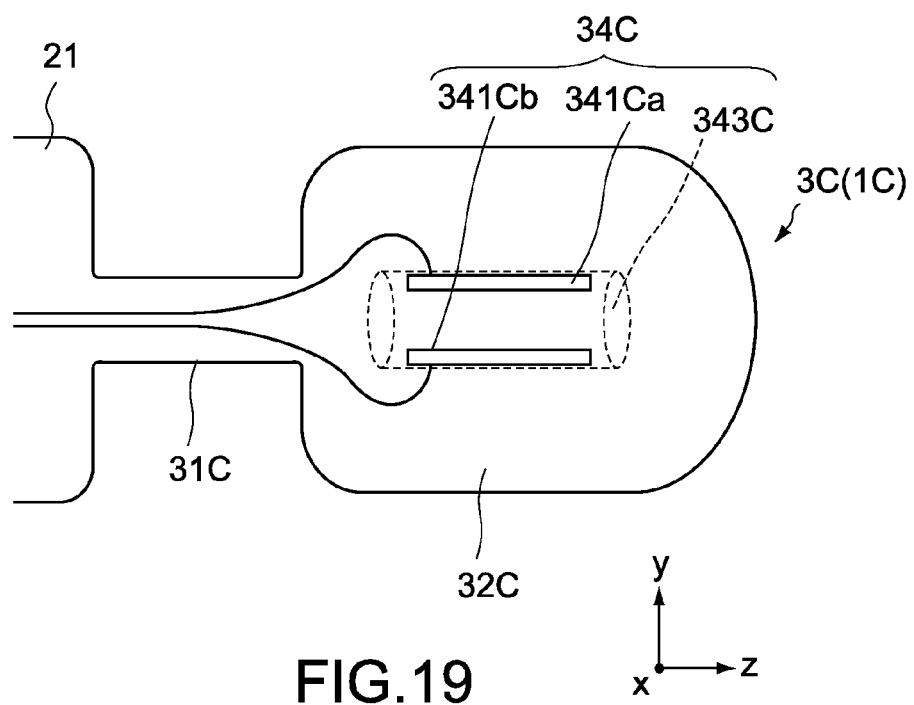
FIG. 19 is a schematic side view showing an HMD according to a fourth embodiment of the present disclosure.
Figure 20:
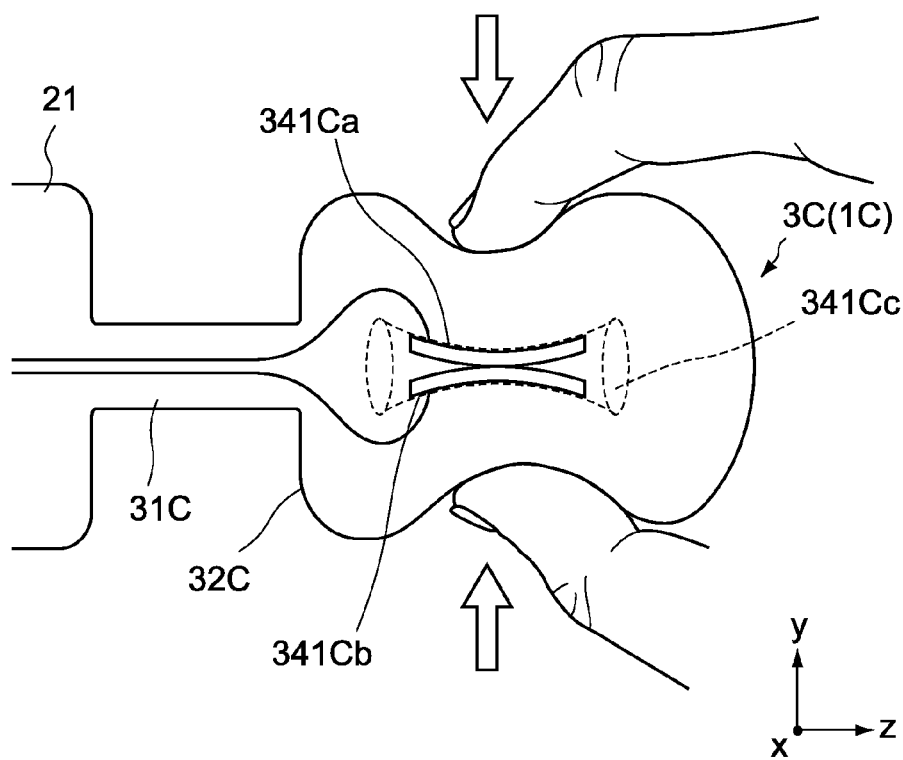
FIG. 20 is a schematic side view of an operation unit for explaining a state of an input operation of the HMD shown in FIG. 19.

FIGS. 19 and 20 are views each showing a configuration of an operation unit according to a fourth embodiment of the present disclosure. FIG. 19 is a schematic side view. FIG. 20 is a schematic side view for explaining an aspect of an input operation. Note that, in the figure, portions corresponding to those of the above-mentioned first embodiment will be denoted by the same reference symbols and detailed descriptions thereof will be omitted.

An HMD 1C according to this embodiment is different from the HMD 1 according to the first embodiment in that a second detector 34C of an operation unit 3C is provided. In other words, the second detector 34C according to this embodiment includes two conductive sheets 341Ca and 341Cb, a space portion 343C, and a detection circuit (not shown). Note that the first detector has the same configuration as that of the first embodiment, and hence the configuration of the first detector is omitted in FIGS. 19 and 20.

The conductive sheets 341Ca and 341Cb are provided to be opposed to each other in the y-axis direction inside a tab portion 32C via an insulator. The conductive sheets 341Ca and 341Cb are configured to be electrically conducted due to the compression-deformation of the tab portion 32C. For example, the conductive sheets 341Ca and 341Cb are formed of a rectangular aluminum film. However, the shape and the material are not particularly limited. In this embodiment, the conductive sheets 341Ca and 341Cb are arranged in a peripheral surface of the space portion 343C and opposed to each other via the air being the insulator. Further, the space portion 343C is not particularly limited. For example, the space portion 343C may be formed in a cylinder shape, a prismatic shape, or a semi-cylinder shape.

The detection circuit is configured with the conductive sheets 341Ca and 341Cb being a switch. For example, if the tab portion 32C is compression-deformed as shown in FIG. 20, the conductive sheets 341Ca and 341Cb are electrically conducted, such that a current flows in the detection circuit. With this, the detection circuit is capable of outputting a detection signal according to on/off of a current.

Even if such a second detector 34C, it is possible to detect the compression-deformation of the tab portion 32C and perform a decision operation of the GUI on the display image, for example. According to this embodiment, it is possible to simplify the configuration of the second detector 34C and to achieve low costs of production and a reduction of the weight of the HMD 1C. Further, the conductive sheets 341Ca and 341Cb are brought into contact with each other by a compression-deformation operation. Thus, the user can be provided with a click feeling.

Fifth Embodiment

Figure 21:
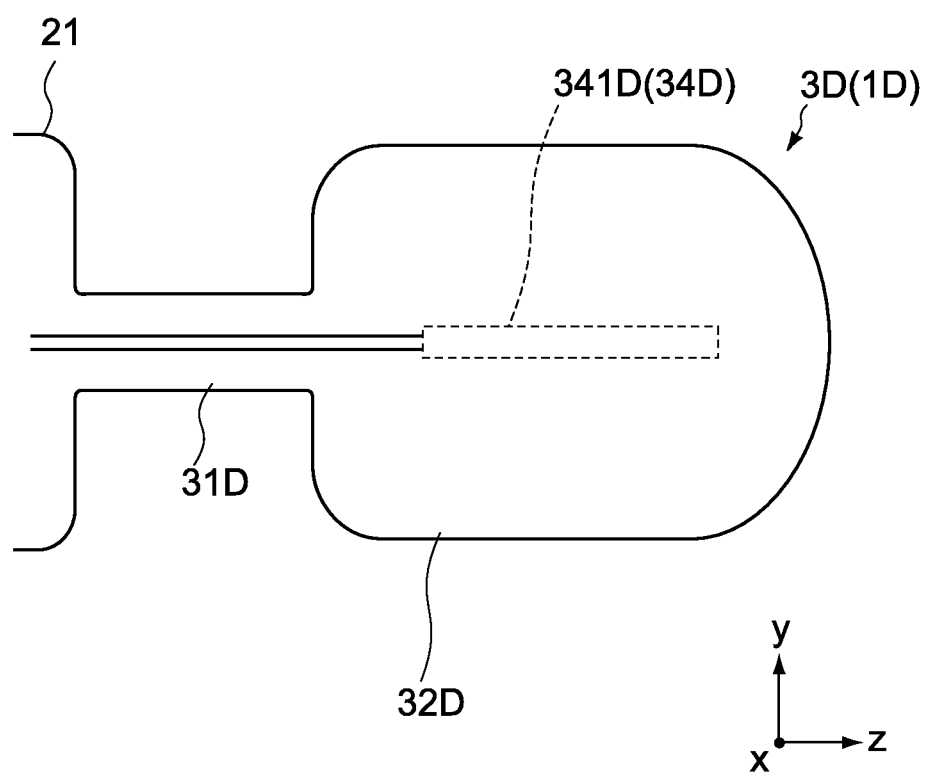
FIG. 21 is a schematic side view showing an HMD according to a fifth embodiment of the present disclosure.

FIG. 21 is a schematic side view showing a configuration of an operation unit according to a fifth embodiment of the present disclosure. Note that, in the figure, portions corresponding to those of the above-mentioned first embodiment will be denoted by the same reference symbols and detailed descriptions thereof will be omitted.

An HMD 1D according to this embodiment is different from the HMD 1 according to the first embodiment in that a second detector 34D of an operation unit 3D is provided. In other words, the second detector 34D according to this embodiment includes a strain gauge 341D. The strain gauge 341D is provided inside a tab portion 32D along not the y-axis direction but the z-axis direction. With this, for example, the tab portion 32D is compression-deformed by the user to be pushed in the z-axis direction. Thus, a strain is generated also in the strain gauge 341D. The detection circuit having the same configuration as that of the first embodiment can detect the compression-deformation of the tab portion 32D.

Also according to this embodiment, as in the first embodiment, a decision operation like a click operation of a mouse is made possible by the operation unit 3D.

Sixth Embodiment

Figure 22:
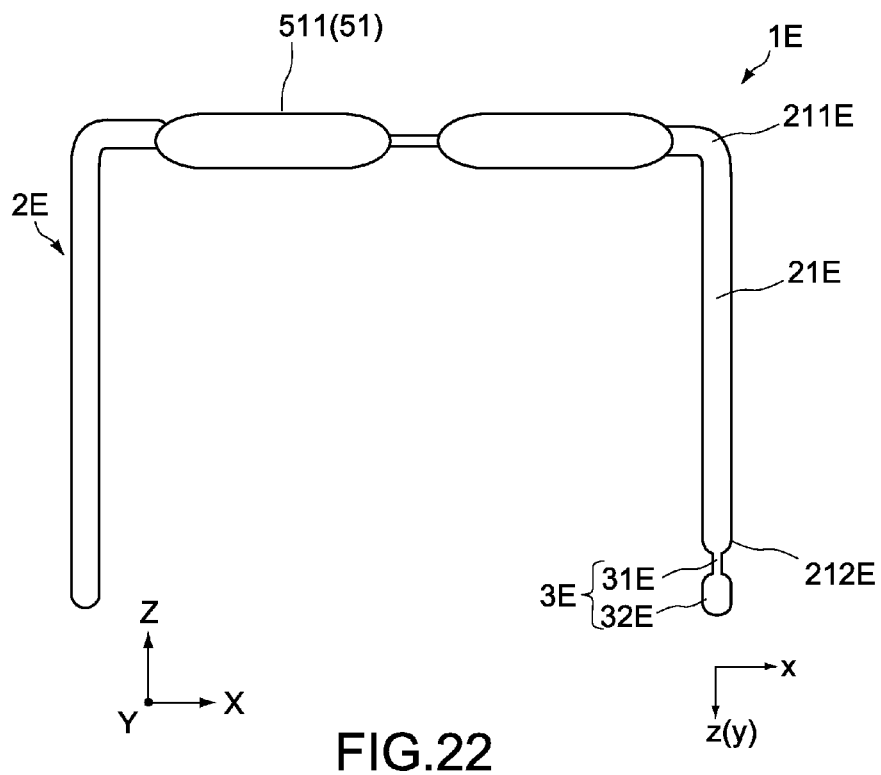
FIG. 22 is a schematic plan view showing an HMD according to a sixth embodiment of the present disclosure.
Figure 23:
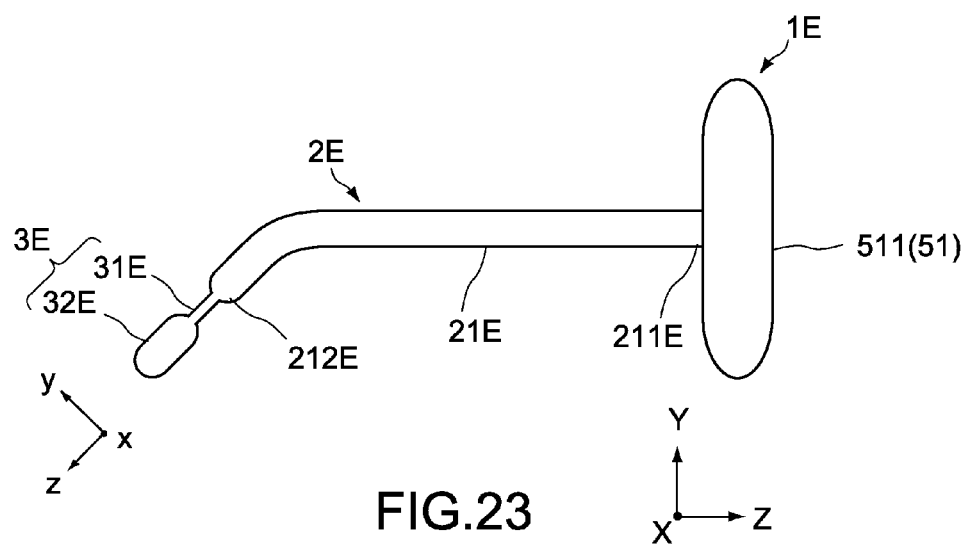
FIG. 23 is a schematic side view of the HMD shown in FIG. 22.
Figure 24:
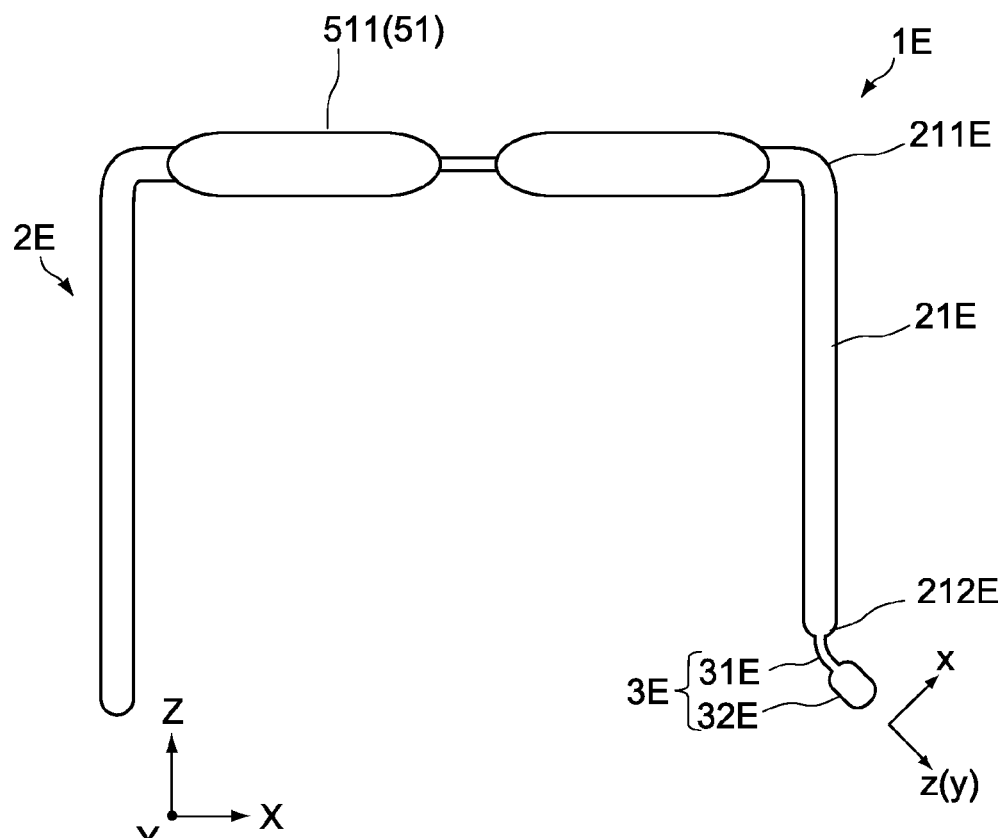
FIG. 24 is a schematic plan view showing a modified example of the HMD according to the sixth embodiment of the present disclosure.

FIGS. 22 to 24 are views each showing a configuration of an HMD according to a sixth embodiment of the present disclosure. FIG. 22 is a schematic plan view. FIG. 23 is a schematic side view. FIG. 24 is a schematic plan view showing a modified example of the HMD shown in FIG. 22. Note that, in the figure, portions corresponding to those of the above-mentioned first embodiment will be denoted by the same reference symbols and detailed descriptions thereof will be omitted.

An operation unit 3E according to this embodiment is provided in a second end portion 21E of a temple portion 21E. Specifically, the operation unit 3E is provided near the back side of the auricle of ear of the user upon mounting. With this, the configuration of the operation unit 3E can be made unnoticeable from the outside, and it is possible to enhance the degree of freedom of design of a main body 2E. Further, as in Example 2 of the first embodiment described above, if the extending direction of the temple portion 21E is provided to form an acute angle with the Z-axis direction (see FIG. 15), the stability of operations can be ensured.

FIGS. 22 and 23 show examples in which the z-axis direction in which the operation unit 3E extends is made corresponding to the extending direction of the temple portion 21E. According to this example, the operation unit 3E does not protrude from the temple portion 21E, and hence it is possible to prevent an operation failure.

FIG. 24 shows another example according to this embodiment. Specifically, FIG. 24 shows an example in which the z-axis direction in which the operation unit 3E extends is provided in a direction intersecting the extending direction of the temple portion 21E such that the operation unit 3E protrudes to an outside of the user upon mounting. For example, in the XZ-plane, an angle formed between the z-axis direction and the temple portion 21E is about 45°. With this, it is possible to easily make an operation and the like of the bending deformation of a buffer 31E, and to enhance the operability.

Seventh Embodiment

Figure 25:
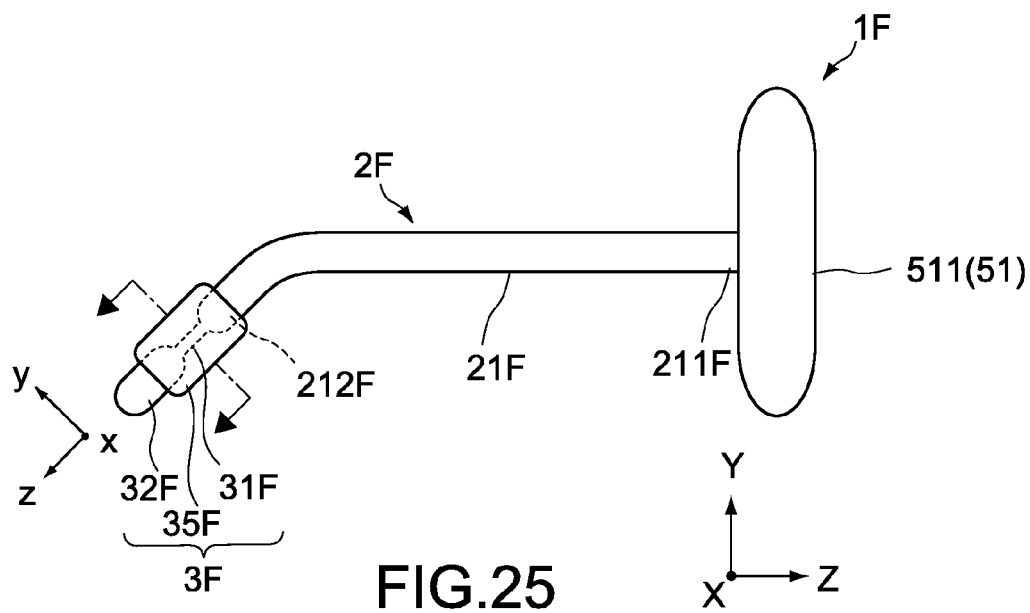
FIG. 25 is a schematic plan view showing an HMD according to a seventh embodiment of the present disclosure.
Figure 26:
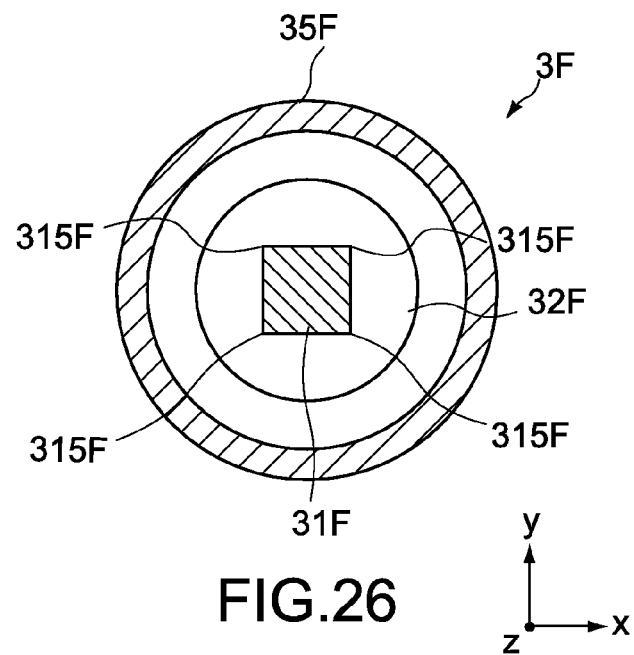
FIG. 26 is a schematic cross-sectional view as viewed in an arrow direction of the HMD shown in FIG. 25.

FIGS. 25 and 26 are views each showing a configuration of an HMD according to a seventh embodiment of the present disclosure. FIG. 25 is a schematic side view. FIG. 26 is a cross-sectional view as viewed in an arrow direction in FIG. 25. Note that, in the figure, portions corresponding to those of the above-mentioned first and sixth embodiments will be denoted by the same reference symbols and detailed description thereof will be omitted.

As in the sixth embodiment, an HMD 1F according to this embodiment includes an operation unit 3F provided to a second end portion 212F of a temple portion 21F. Meanwhile, the operation unit 3F includes a buffer 31F, a tab portion 32F, and first and second detectors (not shown in FIGS. 25 and 26). The operation unit 3F further includes a cover unit 35F. In this point, the seventh embodiment is different from the first and sixth embodiments.

The cover unit 35F is provided to cover around the buffer 31F and not to interfere with deformation of the buffer 31F. That is, the cover unit 35F is formed of a flexible material, for example, cloth or a silicone resin. Further, the cover unit 35F is, for example, formed in a cylindrical shape extending in the z-axis direction as a whole. The cover unit 35F is connected to the second end portion 212F of the temple portion 21F at one end and to the tab portion 32F at the other end. With this, the cover unit 35F is capable of covering the buffer 31F without interfering with the deformation of the buffer 31F.

According to this embodiment, the cover unit 35F covers the buffer 31F. Thus, the strain gauge and the like can be prevented from being exposed to the outside. It is possible to prevent damages due to impact, friction, and the like from the outside. In addition, the design can be improved.

Eighth Embodiment

Figure 27:
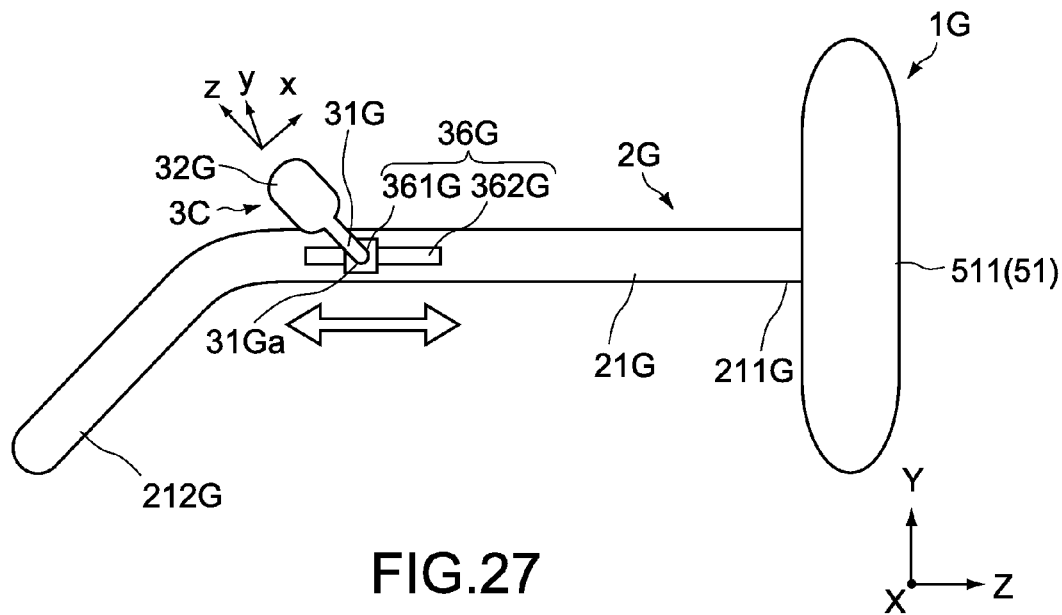
FIG. 27 is a schematic plan view showing an HMD according to an eighth embodiment of the present disclosure.

FIG. 27 is a schematic side view showing a configuration of an HMD according to an eighth embodiment of the present disclosure. Note that, in the figure, portions corresponding to those of the above-mentioned first embodiment will be denoted by the same reference symbols and detailed descriptions thereof will be omitted.

A schematic configuration of an HMD 1G according to this embodiment is the same as that of the HMD 1 according to the first embodiment. However, the HMD 1G is different from the HMD 1 in that an operation unit 3G is configured to be partially movable between first and second end portions 211G and 212G of a temple portion 21G. In other words, the operation unit 3G according to this embodiment includes a buffer 31G, a tab portion 32G, first and second detectors (not shown in FIG. 27), and further, a movement mechanism 36G.

The movement mechanism 36G includes an engagement unit 361G and an engagement groove 362G. The engagement unit 361G is provided in a first connection end portion 31Ga of the buffer 31G. The engagement groove 362G is formed on the temple portion 21G and provided along the Z-axis direction. The engagement unit 361G is configured to be slidable in the z-axis direction (white arrow directions in FIG. 27) while being engaged to the engagement groove 362G. With this, the user can move the operation unit 3G to a position at which it is easy to operate the operation unit 3G. Thus, it becomes possible to realize a desired feeling of operation to each user.

Note that the movement mechanism 36G may include, for example, a lock mechanism (not shown) capable of engaging the engagement unit 361G at a predetermined position of the engagement groove 362G. In addition, the movement mechanism 36G may be configured to be capable of changing an angle of an extending direction (z-axis direction) of the operation unit 3G with respect to the temple portion 21G. With this, it becomes possible to further enhance the operability depending on each user.

Hereinabove, the embodiments of the present disclosure have been described. However, the present disclosure is not limited thereto and various modifications can be made based on the technical concept of the present disclosure.

Figure 28:
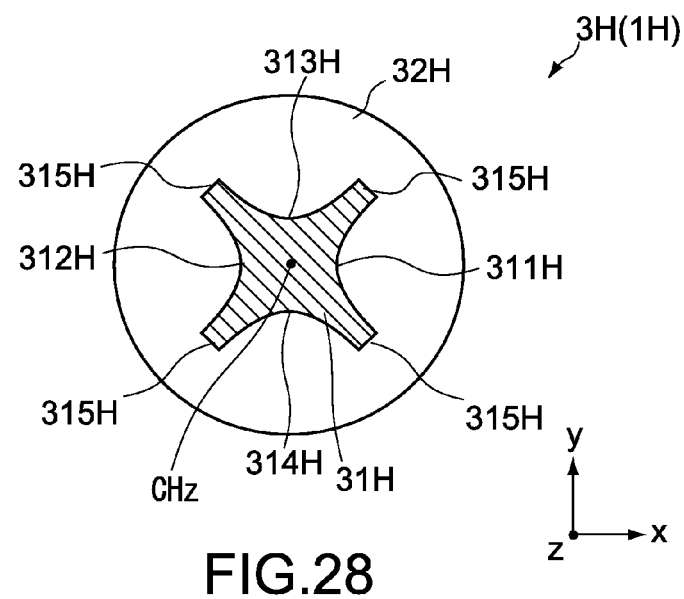
FIG. 28 is a schematic cross-sectional view of an operation unit showing a modified example according to the first embodiment of the present disclosure.

FIG. 28 is a view showing a modified example of the operation unit according to the first embodiment. Specifically, FIG. 28 is a schematic cross-sectional view of a buffer as viewed in the z-axis direction (i.e., direction same as in FIG. 7).

A buffer 31H according to a modified example shown in FIG. 28 includes protrusion portions 315H each having a longer distance from a center (center of figure) CHz than other areas. Unlike the protrusion portions 315 described in each of the above-mentioned embodiments, the protrusion portions 315H protrude at an acute angle. With this, as in the first embodiment, in comparison with the case where the protrusion portions 315 protrude at a right angle, a distance difference from the center CHz between the protrusion portions 315H and the first to fourth faces 311H to 314H of the buffer 31H becomes larger. Therefore, in comparison with the first embodiment, the buffer 31H has a higher anisotropy regarding "ease of bending." Thus, it is possible to allow the user to further feel "ease of bending" upon an input operation.

Figure 29:
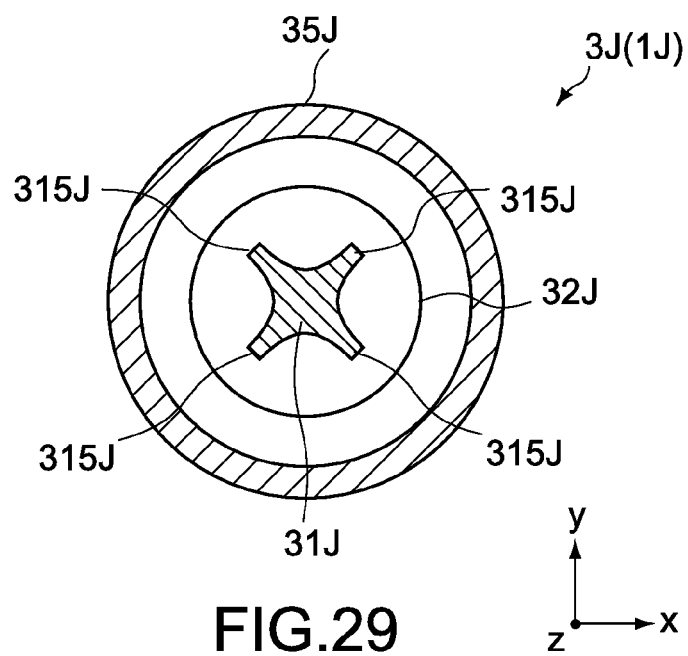
FIG. 29 is a schematic cross-sectional view of an operation unit showing a modified example according to a seventh embodiment of the present disclosure.

Meanwhile, FIG. 29 is a schematic cross-sectional view of the buffer as viewed in the z-axis direction (i.e., direction same as in FIG. 23), which shows a modified example of the seventh embodiment. In an operation unit 3J according to this modified example, protrusion portions 315J protrude at an acute angle as in the buffer 31H shown in FIG. 25. In the operation unit 3J having such a configuration, a cover unit 35J covers the buffer 31F. Thus, it is possible to prevent damages due to impact, friction, and the like from the outside. At the same time, it is possible to allow the user to further feel "ease of bending" upon an input operation.

Figure 30:
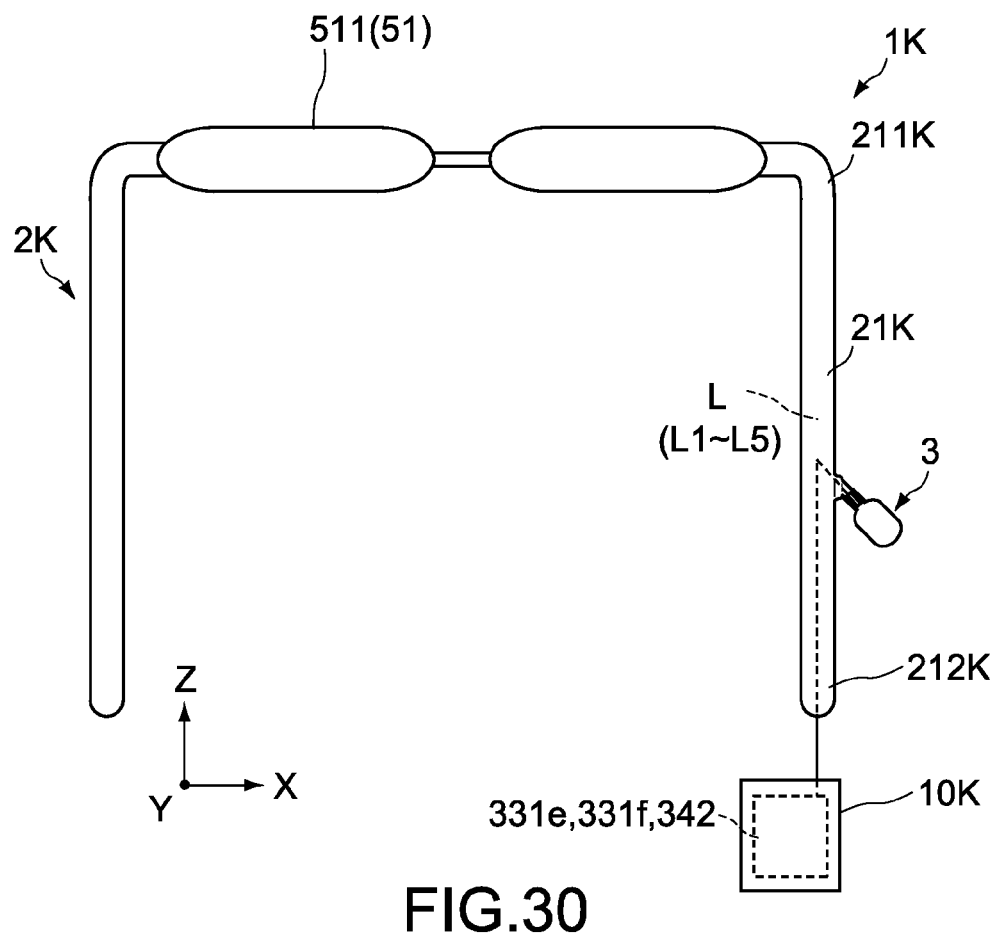
FIG. 30 is a schematic plan view showing a modified example according to the first embodiment of the present disclosure.

Further, FIG. 30 is a schematic plan view showing a modified example of the first embodiment. An HMD 1K according to this modified example houses a controller 4, a storage unit 6, a communication unit 7, a speaker 8, a battery BT, and the like in addition to a housing portion 213. The HMD 1K includes a casing 10K to be connected to the main body 2. With this, a main body 2K of the HMD 1K can be reduced in weight. A connection method between the casing 10K and the main body 2K is not particularly limited. The casing 10K and the main body 2K may be connected to each other in a wired manner, for example, via a cable, or a wireless manner.

Further, in the above-mentioned modified examples, the detection circuits 331$e$ and 331$f$, 342 may be housed in the casing 10K. In this case, as shown in FIG. 30, wirings L (wirings L1 to L5) pass through a temple portion 21K and is connected from a second end portion 212K into the casing 10K in a wired manner, for example. Each of the detection circuits 331$e$ and 331$f$, 342 are connected to the controller 4 within the casing 10K and configured to output detection signals to the controller 4.

Further, although, in each of the above-mentioned embodiments, the bending deformation sensor unit includes the strain gauge, other strain gauges may be used. For example, the bending deformation sensor unit may include a pressure-sensitive conductive rubber in place of the strain gauge. The pressure-sensitive conductive rubber is a material obtained by doping conductive particles in an insulating polymer such as a silicone resin, and changes in the resistance value when being pressed. With this, it becomes possible to detect the bending deformation. Further, other known strain gauges such as a piezoelectric element, an acceleration sensor, a polymer actuator element, and an ultrasonic transceiver element may be used. Similarly, the various strain gauges as described above may be used also for the compression-deformation sensor unit and the torsion deformation sensor unit.

In addition, even if the bending deformation sensor unit includes the two pairs of strain gauges, the present disclosure is not limited to the state in which the bending deformation sensor unit is provided on the buffer. For example, the bending deformation sensor unit may be embedded in the buffer.

Further, as a modified example of the fourth embodiment, the compression-deformation sensor unit may be configured to obtain a click feeling. In other words, the compression-deformation sensor unit is configured to include, in place of the conductive sheet, a movable contact point and a fixed contact point. The movable contact point is formed of a plate spring having an inverted dome shape provided in a periphery of the space portion. The fixed contact point is provided in the periphery of the space portion to be opposed to the movable contact point. With this, if the tab portion is compression-deformed in a direction in which those contact points are opposed to each other, a click feeling by a so-called tactile feed back mechanism of the dome-shaped plate spring can be obtained. Further, as the compression-deformation sensor unit, another known click mechanism may be adopted.

Further, although, in each of the above-mentioned embodiments, the buffer and the tab portion are integrally formed, the buffer and the tab portion are not limited thereto. For example, the tab portion may be configured as a member separate from the buffer. In this case, the tab portion may be formed of a material having lower flexibility than that of the buffer made of, for example, a plastic resin. In addition, the tab portion may be provided with a switch that can be pressed. With this, even if the tab portion is not formed of a flexible material, pressing the switch enables a decision operation like a left click of a mouse to be performed.

In addition, although, in each of the above-mentioned embodiments, the buffer is formed of a prismatic shape, a cylinder shape, or the like, the buffer is not limited thereto as long as a predetermined input operation such as the bending deformation and the torsion deformation can be made. For example, the buffer may be formed of a truncated pyramid shape or a circular truncated cone shape.

Although, in each of the above-mentioned embodiments, the material of the buffer is a material more flexible than the main body, the material of the buffer is not limited thereto. For example, also by forming the buffer by a material such as a metal similar to the main body and forming the buffer to be elongated in a wire shape, the buffer can be configured to be deformable with respect to the main body.

In addition, an configuration without the second detector may be adopted. Also with such a configuration, if the bending detection sensor unit detects an input operation of, for example, bending at predetermined speed or more, the controller is capable of determining that a decision operation has been made. With this, the configuration of the operation unit can be simplified and the decision operation can also be made possible.

Although, in the above-mentioned embodiments, the operation unit is provided to the temple portion, the operation unit is not limited thereto. For example, the operation unit may be provided to a rim portion.

Further, although, in each of the above-mentioned embodiments, the HMD is a see-through HMD, the HMD is not limited thereto. The HMD may be a non-see-though HMD.

It should be noted that the present disclosure may also take the following configurations.

(1) A head-mounted display, including:
a main body including a display unit capable of displaying an image in front of an eye of a user;
an operation unit including
a buffer that is connected to the main body and deformable with respect to the main body, and
a first detector configured to output a detection signal depending on the deformation; and
a controller configured to generate an image signal for generating an image based on the detection signal and to output the image signal to the display unit.

(2) The head-mounted display according to Item (1), in which
the buffer is formed along a first axis direction, and
the operation unit is connected to the buffer and further includes a tab portion that is less easily deformed than the buffer.

(3) The head-mounted display according to Item (1) or (2), in which
the buffer is formed of a material more flexible than the main body.

(4) The head-mounted display according to any one of Items (1) to (3), in which
the buffer is formed to be thinner than the tab portion as viewed in the first axis direction.

(5) The head-mounted display according to any one of Items (1) to (4), in which
the buffer is capable of being bent in a direction orthogonal to the first axis direction, and the first detector further includes a bending deformation sensor unit configured to output a detection signal based on a strain based on bending of the buffer.

(6) The head-mounted display according to Item (5), in which
the bending deformation sensor unit includes two pairs of strain gauges provided to the buffer to be opposed to each of second and third axis directions orthogonal to the first axis direction and arranged along the first axis.

(7) The head-mounted display according to Item (5) or (6), in which
the buffer includes a protrusion portion formed along the first axis direction.

(8) The head-mounted display according to any one of Items (5) to (7), in which
the tab portion is capable of being compression-deformed, and
the operation unit further includes a second detector that is provided to the tab portion and configured to output a detection signal based on compression-deformation of the tab portion.

(9) The head-mounted display according to any one of Items (5) to (8), in which
the buffer is capable of being torsion-deformed around the first axis, and
the first detector further includes a torsion deformation sensor unit that is provided to the buffer and configured to output a detection signal based on torsion of the buffer.

(10) The head-mounted display according to any one of Items (1) to (9), in which
the main body further includes a temple portion including a first end portion that is connected to the display unit, and a second end portion that is engaged to an auricle of the user, and
the operation unit is connected to the temple portion.

(11) The head-mounted display according to Item (10), in which
the operation unit is connected to protrude in the first axis direction, and
the temple portion extends in a second axis direction intersecting the first axis direction.

(12) The head-mounted display according to Item (10) or (11), in which
the operation unit is connected between the first end portion and the second end portion of the temple portion.

(13) The head-mounted display according to Item (10) or (11), in which the operation unit is connected to the second end portion of the temple portion.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:
1. A head-mounted display, comprising:
a main body that includes a display unit, wherein the display unit is configured to display an image in front of an eye of a user;
an operation unit that includes:
a buffer that is connected to the main body and deformable with respect to the main body;
a first detector configured to output a detection signal based on a bending movement when the buffer is deformed; and a tab portion coupled to the buffer, wherein a strain gauge, inside the tab portion, is orthogonal to a first axis that passes through a first connection end and a second connection end of the buffer, wherein the first connection end couples the buffer to the main body and the second connection end couples the buffer to the tab portion; and a controller configured to generate an image signal for generation of the image based on the detection signal and to output the image signal to the display unit, wherein the operation unit is connected to a temple portion in the main body, wherein the buffer includes a plurality of protrusion portions along a first axis direction, and wherein a distance from a center of the buffer to each of the plurality of protrusion portions is longer than a distance from the center of the buffer to parts other than the plurality of protrusion portions of the buffer, wherein the bending movement of the buffer is a product of a length of the tab portion and a force exerted on the buffer by the user.

2. The head-mounted display according to claim 1, wherein the buffer is along the first axis direction, and wherein the tab portion is less easily deformed than the buffer.

3. The head-mounted display according to claim 1, wherein the buffer includes a material more flexible than the main body.

4. The head-mounted display according to claim 1, wherein the buffer is thinner than the tab portion as viewed in the first axis direction.

5. The head-mounted display according to claim 1, wherein the buffer is configured to be bent in a direction orthogonal to the first axis direction, and the first detector further includes a bending deformation sensor unit configured to output the detection signal based on a strain based on the bending movement of the buffer.

6. The head-mounted display according to claim 5, wherein the bending deformation sensor unit includes two pairs of strain gauges, wherein the two pairs of strain gauges are opposed to each other in second and third axis directions, wherein the second and third axis directions are orthogonal to the first axis direction, and wherein the two pairs of strain gauges are arranged along the first axis.

7. The head-mounted display according to claim 1, wherein the tab portion is configured to deform by compression, and the operation unit further includes a second detector that is provided to the tab portion, and wherein the second detector is configured to output a detection signal based on the deformation of the tab portion.

8. The head-mounted display according to claim 5, wherein the buffer is capable of being torsion-deformed around the first axis, and the first detector further includes a torsion deformation sensor unit that is provided to the buffer and configured to output a torsion deformation detection signal based on torsion of the buffer.

9. The head-mounted display according to claim 1, wherein the main body further includes the temple portion, wherein the temple portion includes:

a first end portion that is connected to the display unit, and a second end portion that is configured to engage with an auricle of the user, and the operation unit is connected to the temple portion.

10. The head-mounted display according to claim 9, wherein the operation unit is connected to protrude in the first axis direction, and the temple portion extends in a second axis direction that intersects the first axis direction.

11. The head-mounted display according to claim 9, wherein the operation unit is connected between the first end portion and the second end portion of the temple portion.

12. The head-mounted display according to claim 9, wherein the operation unit is connected to the second end portion of the temple portion.

13. The head-mounted display according to claim 1, wherein each of the plurality of protrusion portions protrude at an acute angle.

14. The head-mounted display according to claim 1, wherein each of the plurality of protrusion portions protrude at right angle.

15. The head-mounted display according to claim 1, wherein the operation unit is connected to the temple portion, in the main body, with an angle between a first axis of the operation unit and an axis perpendicular to a display surface of the display unit equal to or less than 45°.

* * * * *